United States Patent
Dariush

(10) Patent No.: US 8,467,904 B2
(45) Date of Patent: Jun. 18, 2013

(54) RECONSTRUCTION, RETARGETTING, TRACKING, AND ESTIMATION OF POSE OF ARTICULATED SYSTEMS

(75) Inventor: Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1709 days.

(21) Appl. No.: 11/614,930

(22) Filed: Dec. 21, 2006

(65) Prior Publication Data

US 2007/0162164 A1    Jul. 12, 2007

Related U.S. Application Data

(60) Provisional application No. 60/753,922, filed on Dec. 22, 2005, provisional application No. 60/753,924, filed on Dec. 22, 2005.

(51) Int. Cl.
*G06T 13/00* (2011.01)
*G06F 19/12* (2011.01)
*G05B 19/00* (2006.01)

(52) U.S. Cl.
USPC ........... 700/262; 700/245; 700/259; 345/474; 382/153

(58) Field of Classification Search
USPC .......... 700/245, 246, 257, 259, 262; 382/153, 382/103, 115, 107; 703/11; 345/474, 473; 702/150; 901/3, 50
See application file for complete search history.

(56) References Cited

U.S. PATENT DOCUMENTS

| | | | |
|---|---|---|---|
| 4,831,549 A * | 5/1989 | Red et al. ..................... 700/254 |
| 4,999,553 A | 3/1991 | Seraji | |
| 5,159,249 A | 10/1992 | Megherbi | |
| 5,293,461 A | 3/1994 | Grudic et al. | |
| 5,341,459 A | 8/1994 | Backes | |
| 5,430,643 A | 7/1995 | Seraji | |
| 5,550,953 A | 8/1996 | Seraji | |
| 5,586,224 A * | 12/1996 | Kunii et al. ................... 700/260 |
| 5,625,577 A * | 4/1997 | Kunii et al. ....................... 703/2 |
| 5,675,720 A | 10/1997 | Sato et al. | |
| 5,737,500 A * | 4/1998 | Seraji et al. .................. 700/251 |
| 5,808,433 A | 9/1998 | Tagami et al. | |
| 6,004,016 A | 12/1999 | Spector | |
| 6,016,385 A | 1/2000 | Yee et al. | |
| 6,236,737 B1 * | 5/2001 | Gregson et al. ............... 382/103 |
| 6,331,181 B1 | 12/2001 | Tierney et al. | |

(Continued)

FOREIGN PATENT DOCUMENTS

JP   S 63-106806 A   5/1988
JP   S 63-300903 A   12/1988

(Continued)

OTHER PUBLICATIONS

PCT International Search Report and Written Opinion, PCT/US08/87657, Mar. 19, 2009, 8 pages.

(Continued)

*Primary Examiner* — Christine Behncke
(74) *Attorney, Agent, or Firm* — Fenwick & West LLP; Mark E. Duell

(57) ABSTRACT

A control system and method generate joint variables for motion or posing of a target system in response to observations of a source system. Constraints and balance control may be provided for more accurate representation of the motion or posing as replicated by the target system.

16 Claims, 10 Drawing Sheets

U.S. PATENT DOCUMENTS

| | | | |
|---|---|---|---|
| 6,341,246 B1* | 1/2002 | Gerstenberger et al. | 700/245 |
| 6,424,885 B1 | 7/2002 | Niemeyer et al. | |
| 6,456,901 B1 | 9/2002 | Xi et al. | |
| 6,493,608 B1 | 12/2002 | Niemeyer | |
| 6,577,925 B1 | 6/2003 | Fromherz | |
| 6,674,877 B1 | 1/2004 | Jojic et al. | |
| 6,699,177 B1 | 3/2004 | Wang et al. | |
| 6,708,142 B1 | 3/2004 | Baillot et al. | |
| 6,786,896 B1* | 9/2004 | Madhani et al. | 606/1 |
| 6,853,964 B1 | 2/2005 | Rockwood et al. | |
| 6,985,620 B2 | 1/2006 | Sawhney et al. | |
| 6,995,536 B2 | 2/2006 | Challoner | |
| 7,106,334 B2 | 9/2006 | Imagawa et al. | |
| 7,274,800 B2 | 9/2007 | Nefian et al. | |
| 7,292,151 B2* | 11/2007 | Ferguson et al. | 340/573.1 |
| 7,386,366 B2 | 6/2008 | Dariush | |
| 7,403,880 B2 | 7/2008 | Maille et al. | |
| 7,457,733 B2 | 11/2008 | Maille et al. | |
| 7,469,166 B2 | 12/2008 | Dariush | |
| 7,573,477 B2 | 8/2009 | Ng-Thow-Hing | |
| 7,688,016 B2 | 3/2010 | Aghili | |
| 7,859,540 B2 | 12/2010 | Dariush | |
| 8,170,287 B2 | 5/2012 | Dariush | |
| 2002/0173878 A1 | 11/2002 | Watanabe et al. | |
| 2003/0113018 A1 | 6/2003 | Nefian et al. | |
| 2003/0171847 A1 | 9/2003 | Cheng et al. | |
| 2004/0193413 A1 | 9/2004 | Wilson et al. | |
| 2004/0267404 A1 | 12/2004 | Danko | |
| 2005/0001842 A1* | 1/2005 | Park et al. | 345/474 |
| 2005/0043718 A1 | 2/2005 | Madhani et al. | |
| 2005/0107916 A1 | 5/2005 | Nagasaka | |
| 2005/0177276 A1 | 8/2005 | Morel et al. | |
| 2005/0209534 A1* | 9/2005 | Dariush | 600/595 |
| 2005/0271279 A1 | 12/2005 | Fujimura et al. | |
| 2006/0269145 A1 | 11/2006 | Roberts | |
| 2006/0293792 A1 | 12/2006 | Hasegawa et al. | |
| 2007/0013336 A1* | 1/2007 | Nowlin et al. | 318/568.21 |
| 2007/0140562 A1 | 6/2007 | Linderman | |
| 2007/0162164 A1 | 7/2007 | Dariush | |
| 2007/0233280 A1 | 10/2007 | Bacon et al. | |
| 2007/0255454 A1 | 11/2007 | Dariush | |
| 2008/0019589 A1 | 1/2008 | Yoon et al. | |
| 2008/0181459 A1 | 7/2008 | Martin et al. | |
| 2008/0234864 A1 | 9/2008 | Sugiura et al. | |
| 2008/0317331 A1 | 12/2008 | Winn et al. | |
| 2010/0145521 A1* | 6/2010 | Prisco et al. | 700/264 |

FOREIGN PATENT DOCUMENTS

| | | |
|---|---|---|
| JP | 08-108383 A | 4/1996 |
| JP | 10-097316 | 4/1998 |
| JP | 11-33958 A | 2/1999 |
| JP | 2003-89082 A | 3/2003 |
| JP | 2003-308532 | 10/2003 |
| JP | 2005-527004 | 9/2005 |
| WO | WO 2007/076118 A2 | 7/2007 |
| WO | WO 2007/076118 A3 | 7/2007 |

OTHER PUBLICATIONS

PCT International Search Report and Written Opinion, PCT/US08/81171, Jan. 5, 2009, 10 pages.

PCT International Search Report and Written Opinion, PCT/US08/81201, Jan. 5, 2009, 9 pages.

PCT International Search Report and Written Opinion, PCT/US06/49247, Mar. 4, 2008.

PCT International Search Report and Written Opinion, PCT/US06/49253, May 30, 2008.

PCT International Search Report and Written Opinion, PCT/US07/67289, Mar. 14, 2008.

Anderson, F. C., et al., "Dynamic Optimization of Human Walking," Journal of Biomechanical Engineering, Oct. 2001, pp. 381-390, vol. 123.

Bernstein, N., "The Co-ordination and Regulation of Movements," 1967, Pergamon Press Ltd., pp. 1-196.

Broida, T. J., Estimation of Object Motion Parameters from Noisy Images, IEEE Transactions on Pattern Analysis and Machine Intelligence, Jan. 1986, pp. 90-99, vol. PAMI-8, No. 1.

Buss, S. R., et al., "Selectively Damped Least Squares for Inverse Kinematics," Journal of Graphics Tools, 2005, pp. 37-49, vol. 10, No. 3.

Chan, T. F., et al., "A Weighted Least-Norm Solution Based Scheme for Avoiding Joint Limits for Redundant Joint Manipulators," IEEE Transactions on Robotics and Automation, Apr. 1995, pp. 286-292, vol. 11, No. 2.

Cullum, J., "Numerical Differentiation and Regularization," SIAM J. Numer. Anal., Jun. 1971, pp. 254-265, vol. 8, No. 2.

Dariush, B., "Multi-Modal Analysis of Human Motion from External Measurements," Transactions of the ASME, Jun. 2001, pp. 272-278, vol. 123.

Delp, S. L., et al., "A Computational Framework for Simulating and Analyzing Human and Animal Movement," Computing in Science & Engineering, Sep./Oct. 2000, pp. 46-55.

Featherstone, R., et al., "Robot Dynamics: Equations and Algorithms," IEEE International Conference on Robotics & Automation, 2000, pp. 826-834.

Hsu, P., et al., "Dynamic Control of Redundant Manipulators," Journal of Robotic Systems, 1989, pp. 133-148, vol. 6, No. 2.

Kagami, S., "AutoBalancer: An Online Dynamic Balance Compensation Scheme for Humanoid Robots," Proceedings of the Fourth International Workshop on Algorithmic Foundations on Robotics (WAFR'00), 2000, pp. 329-339.

Khatib, O., "A Unified Approach for Motion and Force Control of Robot Manipulators: The Operational Space Formulation," IEEE Journal of Robotics and Automation, Feb. 1987, pp. 43-53, vol. RA-3, No. 1.

Klein, C. A., et al., "Review of Pseudoinverse Control for Use with Kinematically Redundant Manipulators," IEEE Transactions on Systems, Man, and Cybernetics, Mar./Apr. 1983, pp. 245-250, vol. SMC-13, No. 3.

Luh, J. Y. S., et al., "Resolved-Acceleration Control of Mechanical Manipulators," IEEE Transactions on Automatic Control, Jun. 1980, pp. 468-474, vol. AC-25, No. 3.

Maciejewski, A. A., et al., "Obstacle Avoidance for Kinematically Redundant Manipulators in Dynamically Varying Environments," The International Journal of Robotics Research, 1985, pp. 109-117, vol. 4, No. 3.

Matthies L., et al., "Kalman Filter-based Algorithms for Estimating Depth from Image Sequences," International Journal of Computer Vision, 1989, pp. 209-238, vol. 3.

Nakamura, Y., "Advanced Robotics Redundancy and Optimization," 1991, Addison-Wesley Series in Electrical and Computer Engineering: Control Engineering, Addison-Wesley Publishing Company, Inc., pp. 1-337.

Nakamura, Y., "Inverse Kinematic Solutions with Singularity Robustness for Robot Manipulator Control," Journal of Dynamic Systems, Measurement, and Control, Sep. 1986, pp. 163-171, vol. 108.

Nakazawa, A., et al., "Imitating Human Dance Motions through Motion Structure Analysis," Proceedings of the 2002 IEEE/RSJ International Conference on Intelligent Robots and Systems EPFL, Oct. 2002, pp. 2539-2544, Lausanne, Switzerland.

Piazza, S. J., "Three-Dimensional Dynamic Simulation of Total Knee Replacement Motion During a Step-Up Task," Journal of Biomechanical Engineering, Dec. 2001, pp. 599-606, vol. 123.

Schaal, S., "Learning From Demonstration," Advances in Neural Information Processing Systems, 1997, pp. 1040-1046, vol. 9, Cambridge, MA.

Sciavicco, L., et al., "A Solution Algorithm to the Inverse Kinematic Problem for Redundant Manipulators," IEEE Journal of Robotics and Automation, Aug. 1988, pp. 403-410, vol. 4, No. 4.

Siciliano, B., et al., "A General Framework for Managing Multiple Tasks in Highly Redundant Robotic Systems," Fifth International Conference of Advanced Robotics, ICAR'91, Jun. 1991, pp. 1211-1216, Pisa, Italy.

Tak, S., "A Physically-Based Motion Retargeting Filter," ACM Transactions on Graphics, Jan. 2005, pp. 98-117, vol. 24, No. 1.

Tak, S., et al., "Motion Balance Filtering," Eurographics 2000, 10 pages, vol. 19, No. 3.

Thelen, D. G., "Generating Dynamic Simulations of Movement Using Computed Muscle Control," Journal of Biomechanics, 2003, pp. 321-328, vol. 36.

Ude, A., et al., "Programming Full-Body Movements for Humanoid Robots by Observation," Robotics and Autonomous Systems, 2004, pp. 93-108, vol. 47.

Wampler, II, C. W., "Manipulator Inverse Kinematic Solutions Based on Vector Formulations and Damped Least-Squares Methods," IEEE Transactions on Systems, Man, and Cybernetics, Feb. 1986, pp. 93-101, vol. SMC-16, No. 1.

Yoshikawa, T., "Manipulability of Robotic Mechanisms," The International Journal of Robotics Research, Summer 1985, pp. 3-9, vol. 4, No. 2.

Japanese Patent Office, Non-Final Office Action, Japanese Patent Application No. JP 2010-532163, Dec. 18, 2012, seven pages.

Japanese Office Action, Japanese Application No. P2010-531282, Jun. 18, 2012, 6 pages.

Japanese Patent Office, Final Office Action, Japanese Patent Application No. P2008-547658, Jun. 6, 2011, 8 pages (with English translation).

Japanese Patent Office, Final Office Action, Japanese Patent Application No. P2008-547659, Jun. 5, 2011, 4 pages (with English translation).

United States Patent and Trademark Office, Final Rejection, U.S. Appl. No. 12/317,369, Aug. 31, 2012, 21 pages.

Japanese Patent Office, Office Action, Japanese Patent Application No. P2008-547658, Nov. 21, 2011, six pages.

Japanese Patent Office, Office Action, Japanese Patent Application No. P2008-547659, Nov. 21, 2011, five pages.

* cited by examiner

RECONSTRUCTION, RETARGETTING, TRACKING, AND ESTIMATION OF POSE OF ARTICULATED SYSTEMS

RELATED APPLICATIONS

This application claims a benefit of, and priority 35 USC § 119(e) to, U.S. Provisional Patent Application No. 60/753,922, filed Dec. 22, 2005, and titled "Controlling Robots From Observed Human Motion: A Resolved Acceleration Approach", and, U.S. Provisional Patent Application No. 60/753,924, filed Dec. 22, 2005, and titled "General Framework For Controlling Robots from Observed human Motion", the contents of which are herein incorporated by reference.

This application is related to U.S. patent application Ser. No. 11/614,933, filed on even date herewith, entitled "Reconstruction, Retargetting, Tracking, And Estimation of Motion of Articulated Systems", the subject matter of which is incorporated herein by reference in its entirety.

FIELD OF THE INVENTION

The present invention generally relates to the field of analyzing human or animal motion, and more specifically, to reconstructing, retargetting, tracking, and estimating of human motion or animal motion from low dimensional task descriptors.

BACKGROUND OF THE INVENTION

More than a half century ago, Bernstein, a neuroscientist, introduced a series of questions related to control of redundant degrees of freedom in the human motor system. (See N. Bernstein, *The coordination and regulation of movements*, Pergamon, London, 1967, the subject matter of which is incorporated herein by reference in its entirety.) Often referred to as the "degree of freedom" (DOF) problem, Bernstein asked: "How can a neuromuscular system with an exorbitant number of degrees of freedom be made to act as if it had but a few degrees of freedom?" He conjectured that controlled operation of such a system achieves a reduction of mechanical redundancy, effectively by reducing the number of degrees of freedom. Bernstein observed that "dexterity" residing in human motion emerges from accumulated involvement of multi-joint movements in surplus DOFs.

The questions raised by Bernstein have had a profound impact on the analysis and understanding of human motor control. As a result, many established concepts in the theory of human motor development have undergone profound change, and our knowledge has increased greatly. Although many outstanding questions related to "the degree of freedom problem" remain unanswered, the problem has directly or indirectly brought philosophical and physiological insight to many applied science and engineering problems dealing with human and robot motion analysis and control.

Perhaps the most direct analogy of Bernstein's problem has been examined in control of robots which exhibit redundancy with respect to operation of a task. Roboticists have long viewed that redundancy of DOFs with respect to a task enhances dexterity and versatility. Such a notion has been inspirational in the formulation of task oriented control strategies, both at the kinematic and dynamic levels. Redundancy incurs a problem of ill-posedness of inverting the kinematics from task-description space to joint space. In nearly all published material, the ill-posedness of inverse transformations from task space to joint space has been treated by identifying artificial performance indices and determining an inverse kinematics or inverse dynamics solution to minimize it. The appropriate treatment of this ill-posed problem has applications in many disciplines which analyze human motion from low-dimensional motion primitives.

Formalizing Bernstein's conjecture into a control structure allows the representation of the large number of mechanical degrees of freedom involved in the execution of movement tasks to be expressed by lower dimensional motion descriptors. These motion descriptors are sometimes referred to as task descriptors because they are used to describe motion by higher level task variables. In robotics, control policies using task descriptors are generally performed in task space rather than joint space. Task oriented control is compatible with Bernstein's hypothesis and current views in motor learning that suggest the central nervous system organizes or simplifies the control of these degrees of freedom during motion execution and motor learning phase.

As previously stated, controlling tasks generally incurs redundancy when the articulating chain in the mechanism has more degrees of freedom than are required to achieve the task. Many internal joint motions can effectively produce the same desired task motion. The internal self motion manifolds may be keenly utilized to meet additional task requirements besides execution of the task trajectory, thus providing redundancy resolution. The redundancy can be effectively used to keep within joint limits (See C. A. Klein and C. H. Huang, "Review of pseudoinverse control for use with kinematically redundant manipulators," *IEEE Transactions on Systems, Man, and Cybernetics,* 13(3):245-250, 1983, the subject matter of which is incorporated herein by reference in its entirety.), to avoid singularities (See T. Yoshikawa, "Manipulability of robot mechanisms," *Int. J. Robotics Research,* 4(3): 3-9, 1985, the subject matter of which is incorporated herein by reference in its entirety.), to avoid obstacles, and to optimize various other performance criteria.

SUMMARY OF THE INVENTION

Methods and systems provide for reconstructing, retargeting, tracking and estimating motion of an object from observation. The observation may include low dimensional tasking descriptors. Movement of members of a target system, which is an articulated system such as a robot, may be controlled by tracking motion of an observed object. Constraints on movement of the members of the articulated system are enforced. Commands for controlling movement of the members of the articulated system are generated in response to the tracking motion and enforcing the constraints.

In other aspects, a balance control command is generated in response to the commands. The tracking may include first or second order closed loop inverse kinematics, or inverse dynamics, and may include regularization of the inverse Jacobian matrix.

Task descriptors may be used to define motion of a source system, such as a human, and to define motion of the robot. Task variables are assigned to portions of source system. Detecting motion of the portions of the human represented by the task variables is detected. Commands for the articulated system are generated to replicate motion of the source system. The commands for the replication motion are adjusted in response to physical limitations of the articulated system for performing motions.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
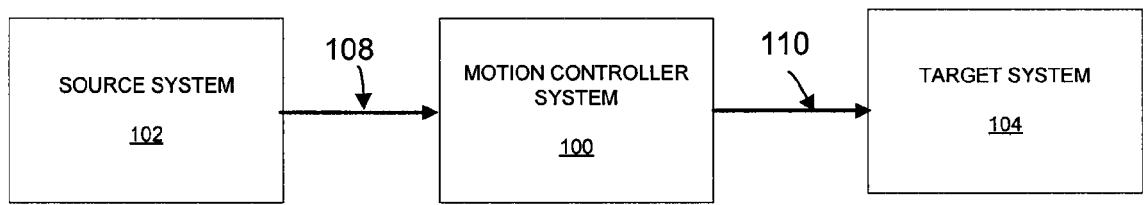
FIG. 1 is a block diagram illustrating a motion controller system for controlling a target system, such as a robotic/bio-robotic system, according to one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as systems or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

A system and method provide a unified task space control framework for analysis, reconstruction, retargetting, and tracking of human motion from low dimensional motion primitives expressed in task space. The system and method may decompose the control structure into tracking control of task descriptors in Cartesian or task space, and also may control internal or "self motion" in the null space of the task.

(See O. Khatib, "A unified approach for motion and force control of robot manipulators: The operational space Formulation", *IEEE Journal of Robotics and Automation*, RA-3(1): 43-53, 1987; see also P. Hsu, J. Hauser, and S. Sastry, "Dynamic control of redundant manipulators", *J. Robotic Systems*, 6(2):133-148, 1989; see also J. Y. S. Luh, M. W. Walker, and R. P. C. Paul, "Resolved-acceleration control of mechanical manipulators", *IEEE Transactions on Automatic Control*, 25:468-474, 1980, the subject matter of which are incorporated by reference in their entirety). The desired task descriptors may be observed or inferred from captured human motion. Task oriented formulations provides flexibility in the sensing and instrumentation used to capture human motion. The controlled variables may be represented by position and orientation information describing the task. Observed task variables include critical points on the body which can be easily observed from measurement. For many tasks, the end-effectors positions and orientations provide sufficient information to describe the task.

FIG. 1 is a block diagram illustrating a motion controller system 100 for controlling a target system 104, such as a robotic/bio-robotic system, according to one embodiment of the present invention. The motion controller system 100 detects task descriptors 108 of a source system 102. The source system 102 may be, for example, a human or an animal. In response to the task descriptors 108, the motion controller system 100 generates joint variables 110 for controlling the motion of the target system 104. The target system may be, for example, an articulated system, such as a robot or an articulated mechanism (e.g., a human model).

The motion controller system 100 may be used, for example, for retargetting, human pose estimation, tracking and estimation, or joint torque estimation in biomechanics.

Retargetting

The motion controller system 100 captured human motion data as examples to simplify the process of programming or learning complex robot motions. (See A. Nakazawa, S. Nakaoka, K. Ikeuchi, and K. Yokoi, "*Imitating human dance motions through motion structure analysis*," Intl. Conference on Intelligent Robots and Systems (*IROS*), pages 2539-2544, Lausanne, Switzerland, 2002, the subject matter of which is incorporated herein by reference in its entirety.) The motion controller system 100 may use to develop algorithms for 'learning from demonstration', a form of learning whereby a robot learns a task by watching the task being performed by a human. (See S. Schaal, "*Learning from demonstration*," M. C. Mozer, M. Jordan, and T. Petsche, editors, *Advances in Neural Information Processing Systems*, chapter 9, pages 1040-1046. MIT Press, 1997, the subject matter of which is incorporated herein by reference in its entirety.) The motion controller system 100 may use 'learning from demonstration' to replace the time-consuming manual programming of a robot by an automatic programming process, solely driven by showing the robot the task by an expert teacher. The motion controller system 100 may use captured human motion in computer animation to 'retarget' motion of one articulated figure to another figure with a similar structure. (See S. Tak and H. Ko, "Motion balance filtering," *Comput. Graph. Forum.* (*Eurographics* 2000), 19(3):437-446, 2000; see also S. Tak and H. Ko, "A physically-based motion retargetting filter", *ACM Trans. On Graphics*, 24(1):98-117, 2005, the subject matter of which are incorporated herein by reference in their entirety.)

Reconstruction—Human Pose Estimation

The motion controller system 100 may reconstruct a human pose from low dimensional motion primitives to perform human motion analysis. The motion controller system 100 may include a task oriented control framework for reconstructing human pose from low dimensional motion descriptors described as task variables. This allows the motion controller system 100 to handle applications involving the recovery of all human degrees of freedom in which the number of observations (or measurements) of features is insufficient or the measurements are occluded. The physical constraints in the motion controller can be used to eliminate physically non-realizable human poses.

Tracking and Estimation

The motion controller system 100 may use, as an alternative approach to an Extended Kalman Filter (EKF), a tool used in computer vision for recursive estimation of object motion parameters from a sequence of noisy images. They can both be viewed as tracking control methods, but are different in functionality and formulation. (See Ted J Broida and Rama Chellappa, "Estimation of object motion parameters from noisy images", *IEEE Transactions on Pattern Analysis and Machine Intelligence*, PAMI-8(1):90-99, 1989; see also Larry Mathies, Takeo Kanade, and Richard Szeliski, "*Kalman filter-based algorithms for estimating depth from image sequences,*" *International Journal of Computer Vision*, 3:209-236, 1989, the subject matter of which are incorporated herein by reference in their entirety.) Like Kalman filters, the motion controller system 100 is based on physical dynamics, which allows for predictive estimation.

The Extended Kalman Filter is often used as an observer to estimate the states which are not directly measurable. Another attribute of the EKF is its predictive capability. The measurement times need not be equally spaced. The time update is performed over any interval during which no data are available. When data becomes available, a measurement update is performed. This means that the cases of intermittent or missing measurements, and pure prediction in the absence of data can easily be dealt with using the EKF. Thus, the EKF may be a useful approach in tracking landmarks which are intermittently occluded from a given camera view.

In one embodiment, the motion controller system 100 uses a resolved acceleration control that may be a tracking control method that has the predictive and estimation benefits of the Kalman Filter with the added advantage that the dynamics represent the true dynamics of the physical system that is driven by inputs corresponding to joint torques.

Joint Torque Estimation in Biomechanics

Studies involving computational analysis of the neuromuscular system are typically concerned with either the synthesis or analysis of human motion. (See S. Delp and P. Loan, "A computational framework for simulating and analyzing human and animal movement," *IEEE Computing in Science and Engineering*, 2(5):46-55, 2000; see also D. Thelen, F. C. Anderson, and S. Delp, "Generating dynamic simulations of movement using computed muscle control," *Journal of Biomechanics*, 36:321-328, 2003, the subject matter of which are incorporated herein by reference in their entirety.) The synthesis problem, often referred to as forward dynamics analysis, provides the motion of the biomechanical system as a consequence of the applied forces and given initial conditions. From a system point of view, let S represent the system equations, describing the equation of motion of processed by the motion controller system 100. Because S may not be known precisely, an estimate (or model) of S may be represented by $\hat{S}$, which describes the forward dynamics equations. By using the solution to the forward dynamics problem, the motion controller system 100 may simulate and predict the body segment's motion. (See F. C. Anderson and M. G. Pandy, "Dynamic optimization of human walking," *Journal of Biomechanical Engineering*, 123:381-390, 2001, the subject matter of which is incorporated herein by reference in its entirety.) Numerical computation of movements produced by forward dynamics simulations have many applications. For example, in an embodiment involving surgical alterations, simulations may predict the anticipated consequences of the surgery on the person's movement pattern. (See S. Piazza and S. Delp, "Three-dimensional dynamic simulation of total knew replacement motion during a step-up task," *Journal of Biomechanical Engineering*, 123:589-606, 2002, the subject matter of which is incorporated herein by reference in its entirety.)

The analysis, or inverse dynamics problem, can be viewed as the inverse of the synthesis problem. This technique provides insights into the net summation of all torques, and all muscle activity at each joint. The inverse dynamics model is a transformation of quantities obtained from a set of inputs derived from measurements to the estimated joint loads. A full kinematic description obtained from motion capture of marker positions is sufficient to obtain an exact or approximate inverse solution; however, motion capture is often combined with output from other sensors, including force plates, in order to improve the precision of the estimated joint loads. Since the optimal representation of the dynamic equations of motion will differ depending on the available sensors, inverse dynamics is in general considered a multi-modal sensing problem. (See B. Dariush, H. Hemami, and M. Parnianpour, "Multi-modal analysis of human movement from external measurements", *Journal of Dynamic Systems, Measurement, and Control*, 123(2):272-278, 2002, the subject matter of which is incorporated herein by reference in its entirety.)

Regardless of the sensing modes, inverse dynamics problems may be limited. First, the inverse dynamics equations are functions of linear and angular accelerations of body segments, using the calculations of higher order derivatives of experimental data contaminated by noise—a notoriously error prone operation (see J. Cullum, "Numerical differentiation and regularization," *SIAM J. Numer. Anal.*, 8(2):254-265, 1971, the subject matter of which is incorporated herein by reference in its entirety.) Second, the applicability of inverse dynamics may be limited to the "analysis" problem. In other words, the solution may not directly answer the "what if" type questions (or the "synthesis" problem) typically encountered in clinical applications and addressed by forward dynamics simulations.

In one embodiment, the motion controller system 100 uses a task oriented resolved acceleration control scheme to a control a framework for analysis and synthesis of human motion, whereby the estimation of internal forces and moments has been formulated as a task space tracking control problem. The system 100 tracks task variables which can represent, for example, the marker positions. Constraints can be imposed to avoid joint limits, muscular torque limits, and self collision avoidance, and the like.

The Source System 102 and Target System 104

Figure 2:
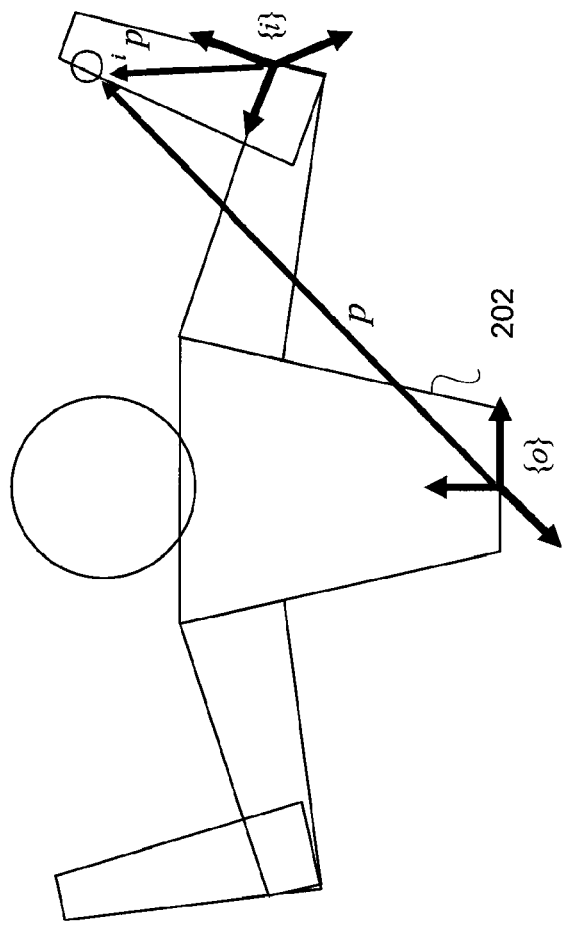
FIG. 2 is a diagram illustrating the association of a single task descriptor between a source model and a target model.
Figure 2:
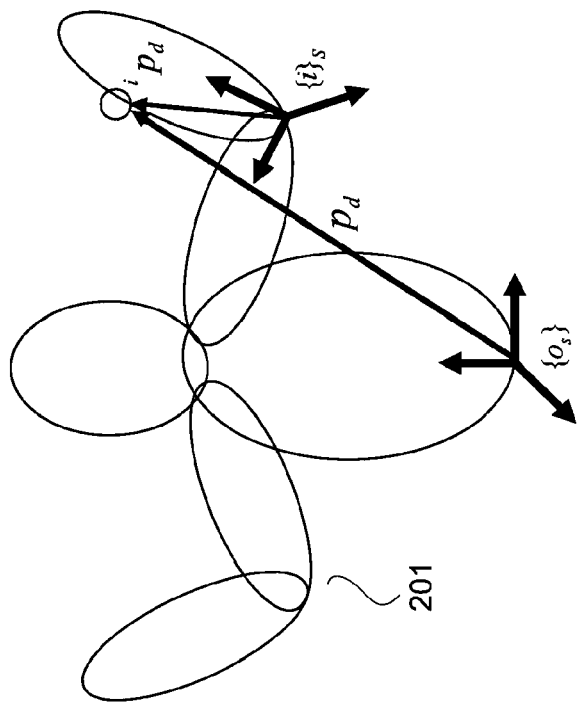

FIG. 2 is a diagram illustrating the association of a single task descriptor between a source model 201 and a target model 202 which corresponds to an articulated system. The source model 201 and the target model 202 may represent models of the source system 102 and the target system 104, respectively. In one embodiment, the source system 102 and the target system 104 are equivalent. In another embodiment, the source system 102 and the target system 104 are two different articulated body systems, and may have different dimensions, physical parameters, and degrees of freedom.

The target system 104 may be described by kinematic parameters or kinematic and dynamic parameters, depending on whether the specific embodiment involves kinematic analysis or dynamic analysis.

In one embodiment, the target system 104 is a physical system or a model of a physical system, and the source system 102 is an abstraction of a physical system or model. The source system 102 may use one or more desired motion primitives, expressed in Cartesian (or task) space that are provided to the target system 104. These motion primitives are referred to as the desired task descriptors, obtained, for example, from either observations (measurements) or generated synthetically. The motion controller system 100 may obtain the desired motion primitives for the target system 104 using knowledge of the kinematic or dynamic structure of the source system 102.

In one embodiment, the source system 102 and the target system 104 may be a "Master-Slave" system where a master system drives the operation of a slave system. In this embodiment, the source system 102 (master) delivers a set of motion primitives that drives the target system 104 (slave). In one embodiment, the source motion is that which is extracted from observations of human motion. For the sake of illustration, without loss of generality, the source system 102 represents a human model and the source motion represents human motion primitives or "task descriptors" which are typically observed or inferred from measurements. Alternatively, the task descriptors may be synthetically generated or obtained from theoretical calculations. The target system 104 may be any generic articulated model, such as a human model or a humanoid robot.

In one embodiment, the dimension of the space to describe all observed task descriptors is different than the total number of degrees of freedom used to define the source system 102. In one embodiment, task descriptors are characterized by a vector space that occupies a smaller dimension that the total number of degrees of freedom specifying the source system 102.

3.1 Partially Observable/Controllable Tasks

An observed task descriptor from the source system 102 has a temporal correspondence between successive observations. In other words, there is a correspondence between the position and/or orientation of a task descriptor at successive time instances when the task descriptor is observable. Furthermore, spatial correspondence is assumed between an observed "Source" task descriptor and its associated "Target" task descriptor. For every observation of a given "Source" task descriptor, a corresponding "Target" task descriptor of the same dimension and analogous degrees of freedom may be defined. The "Source" and "Target" task descriptors need not be represented by six parameters required to specify the position of the task and the orientation of the task frame.

The scenarios for which task descriptors have fewer than six parameters are listed below.

The spatial position and/or orientation of the "Source" task descriptor may be partially observable. In other words, not all six degrees of freedom can be measured. This scenario may occur, for example, if the position variables associated with a task can be deduced from measurements, but not the orientation of the task frame.

The position and orientation of the "Source" task descriptor may be fully observable, but the target system 104 may execute a task with less than all six degrees of freedom. In other words, it suffices to represent the "Source" task descriptor with equal parameters as the "Target" task descriptor, even if the available measurements exceed the requirements to execute the task.

An execution of a task may be limited or impossible if the "Target" system has an insufficient number of degrees of freedom to execute the task.

Figure 3:
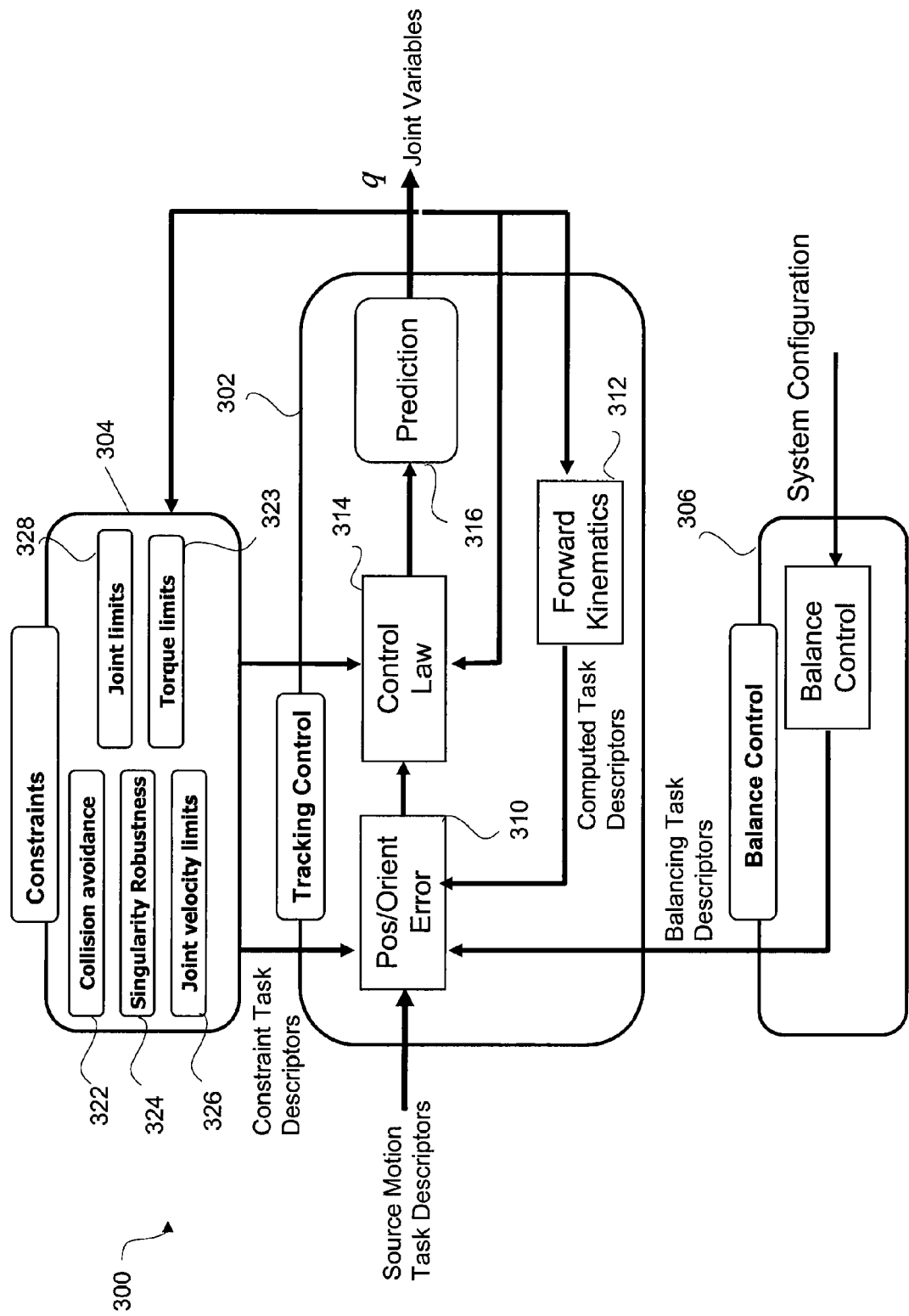
FIG. 3 is a block diagram illustrating a motion controller system for generating motion from observed task descriptors.

FIG. 3 is a block diagram illustrating a motion controller system 300 for generating motion from observed task descriptors. The motion controller system 300 comprises a tracking control system 302, a constraints system 304, and a balance control system 306. The tracking control system 302 generates joint variables q from observed task descriptors 108, constraint task descriptors from the constraints system 304, and balance task descriptors from the balance control system 306.

The tracking control system 302 includes a position/orientation error system 310 to generate an error in response to the observed task descriptors, the constraint task descriptors, the balancing task descriptors, and computed task descriptors from a forward kinematics system 312 of the tracking control system 302. The forward kinematics system 312 generates computed task descriptors in response to the joint variables q. A control law system 314 generates a control signal in response to the position/orientation error from the position/orientation error system 310, the constraint task descriptors from the constraints system 304, and the joint variable q. The prediction system 316 uses the control signal to generate the joint variables q.

The constraints system 304 includes a collision avoidance system 322, a singularity robustness system 324, a joint velocity limits system 326, a joint limits system 328 and a torque limits system 329. The motion controller system 300 is described in more detail below.

Kinematic Structure

Figure 4:
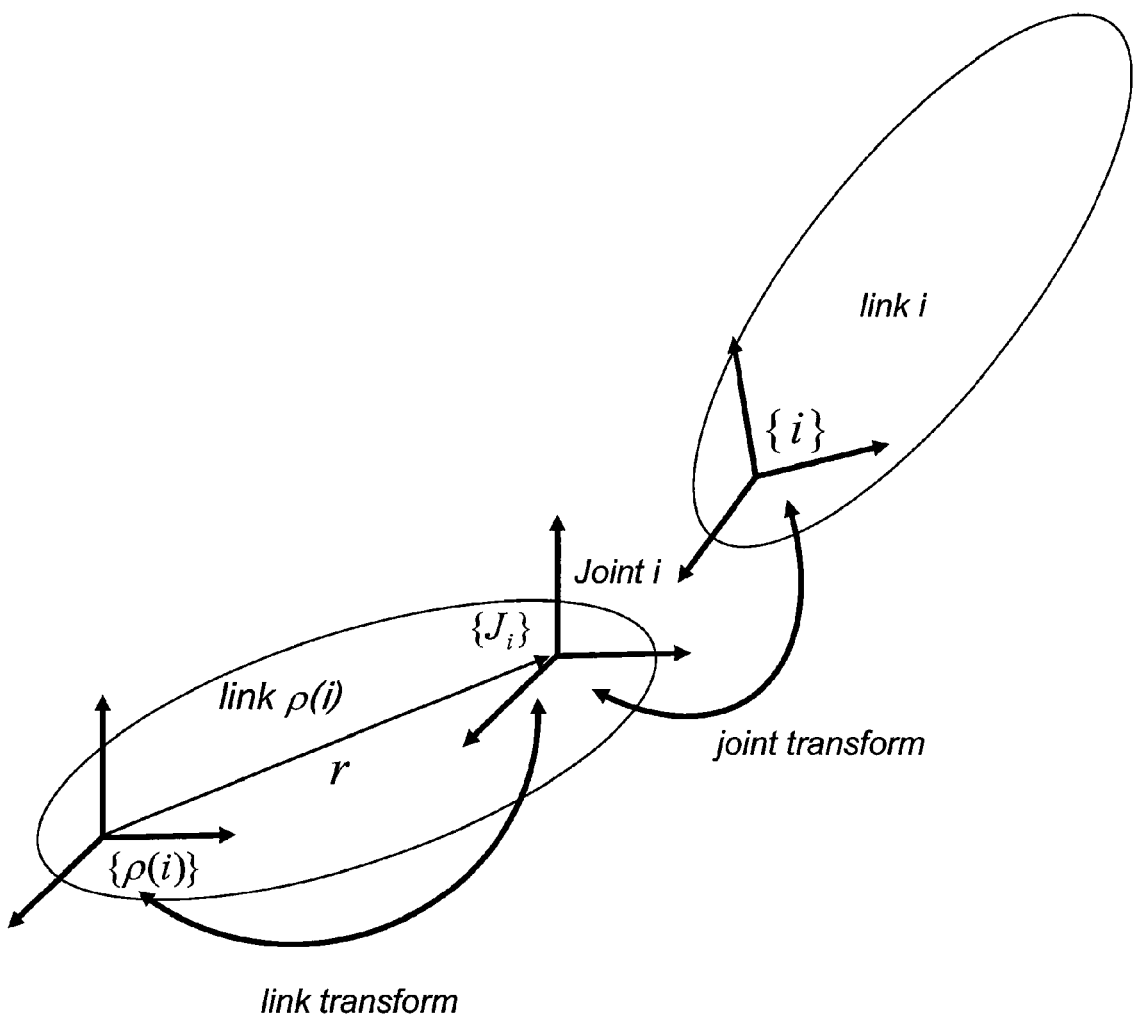
FIG. 4 is a diagram illustrating coordinate frames and transforms associated with a joint of the system of FIG. 1.

A motion controller system 300 is described for one embodiment that includes a kinematic structure. In one embodiment, the target system 104 represents general articulated mechanism with a tree structure. FIG. 4 is a diagram illustrating coordinate frames and transforms associated with a joint of the system 100. The articulated mechanism has N segments, numbered i=1 ... N and a total of $n_t$ degrees of freedom, numbered d=1 ... n. Each joint has $n_i$ degrees of freedom. The system has a fixed or moving base, considered the root node and numbered segment 0. A set of N joints connect between the segments so that joint i connects from segment ρ(i) to segment i, where ρ(i) is the link number of the parent of link i in the tree. The numbers are chosen so that ρ(i)<i. For the special case of an un-branched kinematic chain, ρ(i)=i−1 and the segments and joints are numbered consecutively from the base to the tip. Segment i has a set of children defined by c(i)={j} with:

$$c(i)=\{j|\rho(j)=i\} \quad (1)$$

Link and Joint Geometry

The transformation of a spatial vector quantity from the coordinate system {A} to frame {B} is given by $$^{B}X_{A} = \begin{bmatrix} ^{B}R_{A} & 0 \\ ^{B}R_{A}\tilde{r}_{ab}^{T} & ^{B}R_{A} \end{bmatrix} \quad (2)$$

where $r_{ab}$ is the 3×1 vector from the origin of frame {A} to the origin of frame {B}, with components referred to frame {A}. With the vector $r_{ab}=[r_{ab1}\ r_{ab2}\ r_{ab3}]^T$ the 3×3 skew symmetric matrix $\tilde{r}_{ab}$, is defined as:

$$\tilde{r}_{ab} = \begin{bmatrix} 0 & -r_{ab3} & r_{ab2} \\ r_{ab3} & 0 & -r_{ab1} \\ -r_{ab2} & r_{ab1} & 0 \end{bmatrix} \quad (3)$$

The tilde symbol (~) is used to simplify notation of vector cross products. With this notation, cross products of arbitrary vectors a and b can be expressed as $$a \times b = \tilde{a}b \quad (4)$$

It follows that the transformation of a spatial vector quantity from the coordinate system of the parent link ρ(i) to link i is given by $$^{i}X_{\rho(i)} = \begin{bmatrix} ^{i}R_{\rho(i)} & 0 \\ ^{i}R_{\rho(i)}\tilde{r}^{T} & ^{i}R_{\rho(i)} \end{bmatrix} \quad (5)$$

where r is the 3×1 vector from the origin of frame {ρ(i)} to the origin of frame {i}, with components referred to frame {ρ(i)}. The link-to-link transformation described by Equation 5 includes a constant part, which describes the relative positions of two joints fixed to a single link, and a variable part, which describes the relative positions of two links connected by a joint. The variable part is a function of the appropriate joint variables, or the joint degrees of freedom, and is recomputed as the relative positions of the two links changes. The two transformations, described as link transforms and joint transforms, are illustrated in FIG. 4. The composite transformation given by Equation 6 can thus be decomposed into the product of the joint transform and the link transform, $$^{i}X_{\rho(i)} = {}^{i}X_{J_i}{}^{J_i}X_{\rho(i)} = X_J X_L \quad (6)$$

where $X_J={}^{i}X_{J_i}$ represents the variable joint transform, and $X_L={}^{J_i}X_{\rho(i)}$ represents the constant link transform.

4.2 Jacobians

In one embodiment, the target system 104 operates a task in the full six dimensional task space (n≧m, m=6). The position and orientation of the task descriptor is described by the vector $^op$, and the rotation matrix $^oR$, respectively. The notation of a leading superscript describes the frame that a quantity is referred to. For simplicity, hereafter, the leading superscript is suppressed for any quantity referred to in the base frame. In another embodiment, the target system 104 operates a task that is not completely specified (m<6).

Let the vector $q=[q_1, \ldots, q_n]^T$ describe the degrees of freedom which fully characterize the configuration of the target system 104. The set of all possible configurations is called configuration space, or joint space. The mapping between the joint space velocities and task space velocities is obtained by considering the differential kinematics relating the two spaces, $$\dot{x} = J(q)\dot{q} \qquad (7)$$

where $J \in \Re^{m \times n}$ is the Jacobian of the task.
The vector $\dot{x}$ is defined by, $$\dot{x} = \begin{bmatrix} w \\ p \end{bmatrix} \qquad (8)$$

where w and p are vectors corresponding to the angular velocity of the task frame and the linear velocity of the task position, respectively. The Jacobian matrix may be decomposed into its rotational and translational components, denoted by $J_o$ and $J_p$, respectively, as:

$$J = \begin{bmatrix} J_o \\ J_p \end{bmatrix} \qquad (9)$$

Let ${}^i v_i$ be the velocity of link i, referred to frame i. The standard recursive formula for computing link velocities in the link frame of reference is given by:

$${}^i v_i = {}^i X_{\rho(i)} {}^{\rho(i)} v_{\rho(i)} + h_i \dot{q}_i \qquad (10)$$

where $h_i$ has dimensions $6 \times n_i$ and represents the motion subspace for a particular joint, referred to the coordinate frame of body i. (See, e.g., Roy Featherstone and David Orin, "Robot dynamics: Equations and algorithms", *International Conference on Robotics and Automation*, San Francisco Calif., 2000, the subject matter of which is incorporated herein by reference in its entirety). The motion subspace represents the free modes of joint i, and its columns make up a basis for this vector space. For example, the motion subspace of rotation about the z axis of a revolute joint connecting link i and $\rho(i)$ is given by:

$$h_i = [0\ 0\ 1\ 0\ 0\ 0]^T \qquad (11)$$

Equation 10 can be converted to a summation form:

$$v_i = \sum_k^i X_k h_k \dot{q}_k \qquad (12)$$

where $${}^i X_k = {}^i X_o {}^o X_k \qquad (13)$$

and where k represents the indices of links in the path from link i to the root. As in Equation 7, Cartesian velocities are related to joint velocities as follows:

$${}^i v_i = {}^i J_i \dot{q} \qquad (14)$$

where the Jacobian is expressed in the link frame and can be expressed as, $${}^i J_i = [\ldots J_k \ldots] \qquad (15)$$

where, $$J_k = \begin{cases} {}^i X_k h_k & \text{if } k \text{ is an ancestor of } i \\ 0 & \text{otherwise} \end{cases} \qquad (16)$$

It follows that the Jacobian matrix for link i is related to the Jacobian matrix of its parent link by the following relationship:

$${}^i J_i = \lfloor {}^i X_{\rho(i)}\ {}^{\rho(i)} J_{\rho(i)}\ \vdots\ h_i \rfloor \qquad (17)$$

where the Jacobian of the first link is given by ${}^1 J_1 = h_1$. To obtain the Jacobian referred to the base (or root) frame, the following transformation may be used:

$${}^o J_i = \begin{bmatrix} {}^o R_i & 0 \\ 0 & {}^o R_i \end{bmatrix} {}^i J_i \qquad (18)$$

Hierarchical Control in Motion Generation

Next, a task space control framework is described to generate motion for all degrees of freedom in the target system 104 from a set of desired motion primitives which are either observed from measurements, synthesized, or computed from the current configuration of the target system 104. The motion controller system 300 includes a) the tracking control system 302 to generate motion results in a set of computed task descriptors which track the desired task descriptors, e.g., minimize the Cartesian tracking error; b) the balance control system 306 to control the resulting motion for balance and not move the target system 104 toward instability, and c) the constraint system 304 to provide commands to prevent the target system 104 from violating the physical limits, such as joint limits, velocity limits, torque limits, and also ensures the system 304 avoids obstacles, self collisions, and computational problems arising from singularities. The three control systems 302, 304 and 306 may present a large number of conflicting tasks which may be resolved through a hierarchical task management strategy. The precision of lower-priority (or lower level of importance) factors may be sacrificed at the expense of higher priority (or higher level of importance) factors.

Tracking Control

The tracking control system 302 is next described. In one embodiment, tracking control refers to a control policy that produces the joint variables, defined by the vector q by which the computed task descriptor kinematics track the desired task descriptor kinematics, subject to constraints imposed by the target system 104. The basis for the solution of task space tracking control algorithms are the differential kinematics relating task variables and joint variables. The elemental equations used to compute the joint velocities, $\dot{q}$, from a set of task descriptor velocities, $\dot{x}$, can be obtained by inverting the first or second order differential kinematics described by, $$\dot{x} = J(q)\dot{q} \qquad (19)$$

$$\ddot{x} = J(q)\ddot{q} + \dot{J}(q, \dot{q})\dot{q} \qquad (20)$$

A variety of inverse solution may be obtained from Equation 19 or 20. Generally, but not always, the solutions based on the first order system of Equation 19 deal with the system kinematics only whereas the solutions based on the second order system in equation 20 may involve the kinematic and/or dynamic analysis. Given a set of desired task descriptors, three tracking control formulations are described on the basis of Equations 19 and 20 to produce a set of joint commands.

First Order Closed Loop Inversed Kinematic (CLIK)

Figure 5:
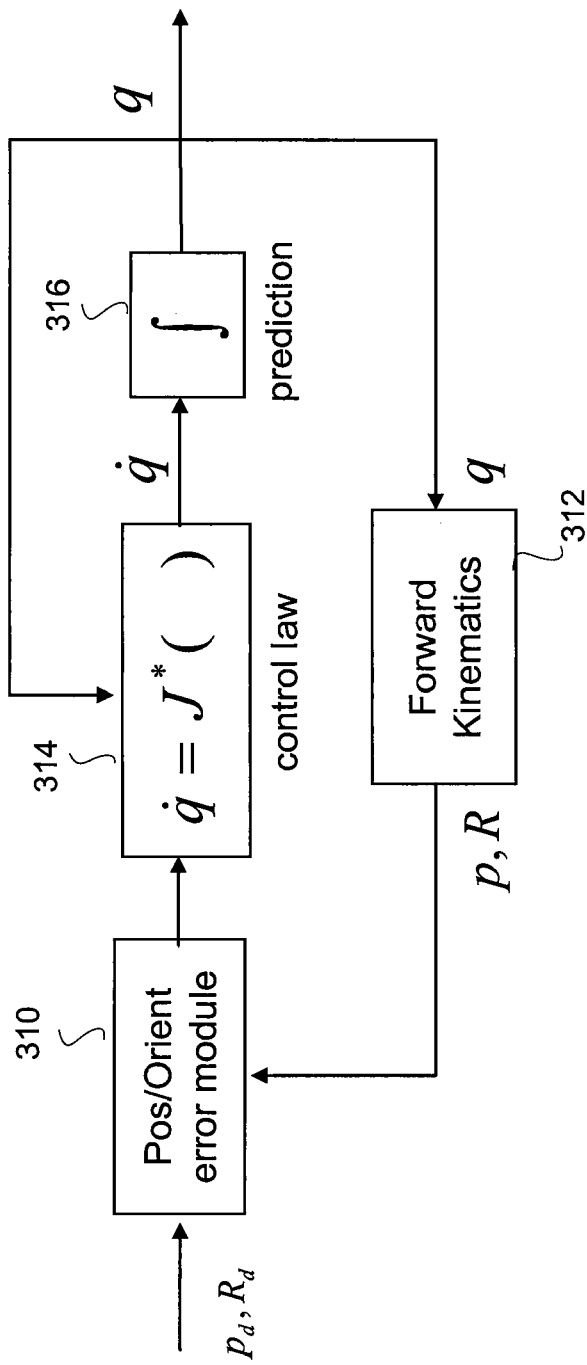
FIG. 5 is a block diagram illustrating a first order closed loop inverse kinematics system without redundancy resolution.

FIG. 5 is a block diagram illustrating the motion controller system 300 that includes a first order closed loop inversed kinematic system without redundancy resolution. The closed loop inversed kinematic (CLIK) control algorithm may be used in order to arrive at a controlled command to follow a time-varying desired position and orientation of task descriptors, e.g., tracking control problem. It should be noted that the system of FIG. 5 has a similar structure as the tracking controlled system 302 illustrated in FIG. 3. Consider the first order differential kinematics given by Equation 19. In one embodiment, a desired motion of a task descriptor in the full six dimensional space is assigned. The associated differential kinematics of the desired motion is expressed by:

$$\dot{x}_d = [w_d \dot{p}_d]^T \quad (21)$$

where the desired angular velocity $w_d$ can be computed from:

$$w_d = H(\Theta_d)\dot{\Theta}_d \quad (22)$$

and the transformation matrix H depends on the particular set of the desired Euler angles, $\theta_d$, considered. Equation 19 can be solved for the joint velocity vector $\dot{q}$, according to the following relationship:

$$\dot{q} = J^* \dot{x}_d \quad (23)$$

where $J^*$ denotes the regularized right pseudo-inverse of J weighted by the positive definite matrix $W_1$ and regularized by the positive definite damping matrix $W_2$, $$J^* = W_1^{-1} J^T (JW_1^{-1} J^T + W_2)^{-1} \quad (24)$$

The damping matrix may be used if J is an ill-conditioned matrix, the details of which are described below. If $W_2 = 0$, then Equation 24 is simply the weighted right pseudo-inverse of J. Furthermore, if J is a square non-singular matrix, $W_1$ is the identity matrix, and $W_2 = 0$, the matrix $J^*$ is replaced by the standard matrix inversion $J^{-1}$.

In a numerical implementation of Equation 23, the reconstruction of joint variables q is entrusted to a numerical integration of $\dot{q}$. A first order numerical integration scheme using the Euler method may be used provided q(0) is known. In the Euler method, future values of the joint displacement, q(t+1), are predicted based on its current values q(t), the current velocity $\dot{q}(t)$, and the integration time-step $\Delta t$, according to the relationship:

$$q(t+1) = q(t) + \dot{q}(t)\Delta t \quad (25)$$

If the time-step is small, the above method represents a good approximation for integration of the continuous differential equation. Nevertheless, some numerical integration methods may suffer from numerical drift. As a result, the task positions and orientations corresponding to the computed joint variables differs from the desired one. To avoid numerical drift, a feedback correction term may be included to correct for errors between the desired and computed task positions and/or orientations. The feedback term replaces the task descriptor velocity $\dot{x}_d$, by $\dot{x}_d + Ke$, such that the inverse kinematics solution is expressed by the following joint command control law:

$$\dot{q} = J^*(\dot{x}_d + Ke) \quad (26)$$

where K is a diagonal 6×6 positive definite gain matrix, and $e = [e_o, e_p]^T$ is a vector that expresses the position error ($e_p$) and the orientation error ($e_o$) between the desired and computed task descriptors. The position error is simply defined as:

$$e_p = p_d - p \quad (27)$$

where $p_d$ and p correspond to the desired and computed task positions, respectively.

Figure 6:
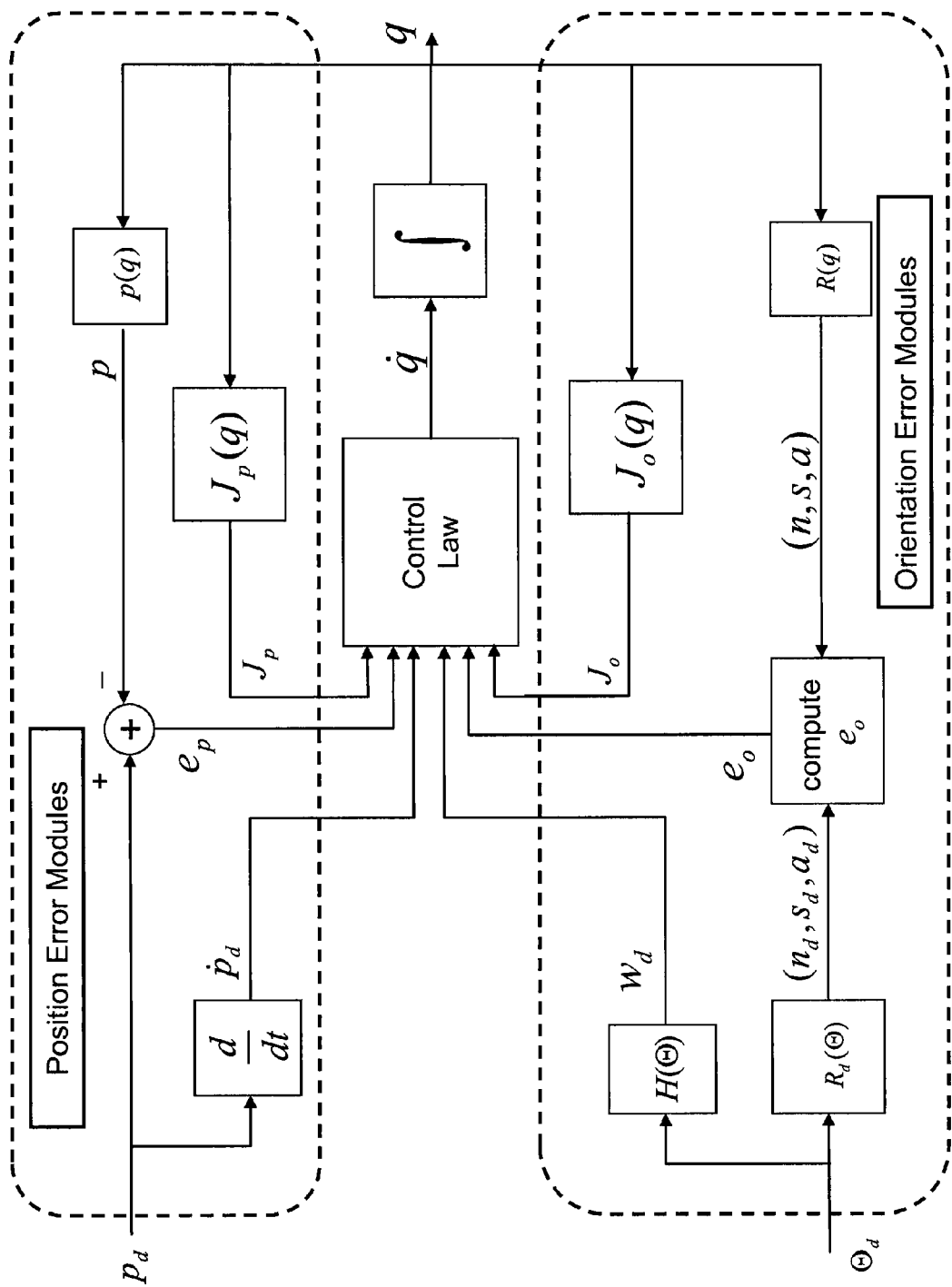
FIG. 6 is a block diagram illustrating a first order closed loop inverse kinematics tracking control system including partitioned position and orientation control systems.

FIG. 6 is a block diagram illustrating a first order closed loop inverse kinematics tracking control system including partitioned position and orientation control systems.

The computation of the orientation error may be complex and may be performed using various representations of orientation. A method based on the angle axis error may use equations 28-30 described below.

The desired task orientation frame is usually described by a minimal number of coordinates, typically three Euler angles, described by the vector $\theta_d$. It should be noted that the desired task orientation may be expressed by parameters other than Euler angles; nevertheless, $\theta_d$ can always be calculated if the desired rotation matrix $R_d$ is known. A functional expression of the orientation error in terms of an angle and axis error is given by:

$$e_o = \frac{1}{2}(n \times n_d + s \times s_d + a \times a_d) \quad (28)$$

where $(n_d, s_d, a_d)$ and $(n, s, a)$ correspond to the desired and actual unit vector triples of the task frame, respectively. (See J. Y. S. Luh, M. W. Walker, and R. P. C. Paul, "Resolved-acceleration control of mechanical manipulators", *IEEE Transactions on Automatic Control*, 25:468-474, 1980, the subject matter of which is incorporated herein by reference in its entirety.) That is, $$R_d = [n_d s_d a_d] \quad (29)$$

$$R = [n s a] \quad (30)$$

2nd Order CLIK

Figure 7:
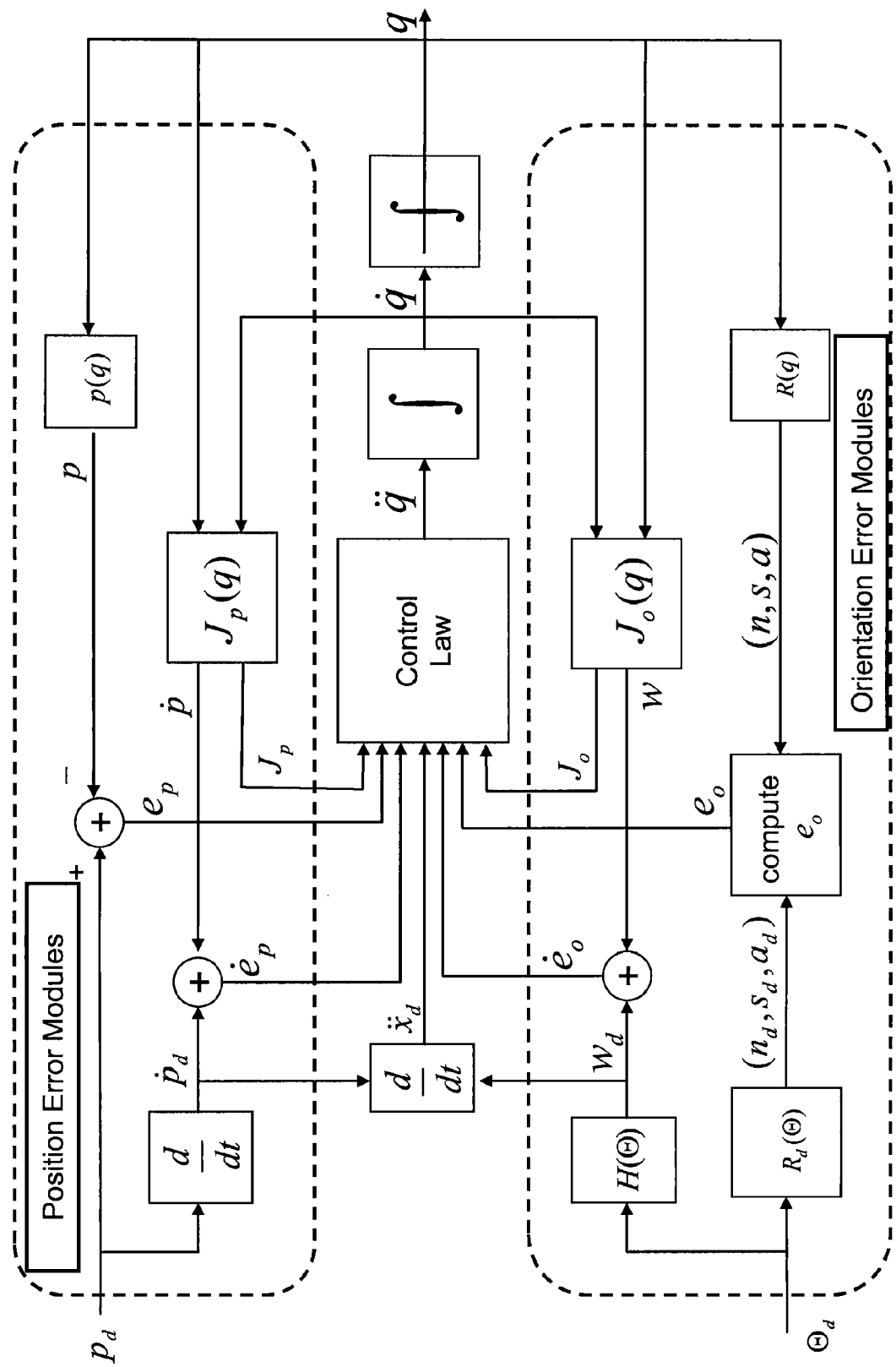
FIG. 7 is a block diagram illustrating a system including a second order closed loop inverse kinematics tracking control with partitioned position and orientation control systems.

FIG. 7 is a block diagram illustrating a system including a second order closed loop inverse kinematics tracking control with partitioned position and orientation control systems.

The first order CLIK trajectory tracking algorithm solves for joint velocities and subsequently the joint displacements. For many types of control methods, joint accelerations also may be solved using a second order inverse kinematics algorithm. The solution of the joint accelerations based on the second order differential kinematics Equation 20 is give by:

$$\ddot{q} = J^*(\ddot{x}_d - \dot{J}\dot{q}) \quad (31)$$

where, $$\ddot{x}_d = [\dot{w}_d \ddot{p}_d]^T \quad (32)$$

A position and velocity feedback term may be introduced in Equation 31 to correct for numerical drift. The resulting second order inverse kinematics control law is given by:

$$\ddot{q} = J^*(\ddot{x}_d - \dot{J}\dot{q} + K_p e + K_v \dot{e}) \quad (33)$$

where $K_p$ and $K_v$ are positive definite gain matrices which can be selected to produce a critically damped response by using the relationship:

$$K_v = 2\sqrt{K_p} \quad (34)$$

The position and orientation error ($e = [e_o e_p]^T$) are defined, as before, by Equations 27 and 28, respectively. The partition of the error rates follows accordingly, $$\dot{e} = [\dot{e}_o \dot{e}_p]^T \quad (35)$$

where $$\dot{e}_p = \dot{p}_d - \dot{p}$$

$$\dot{e}_o = w_d - w \quad (36)$$

Inverse Dynamics Control

Figure 8:
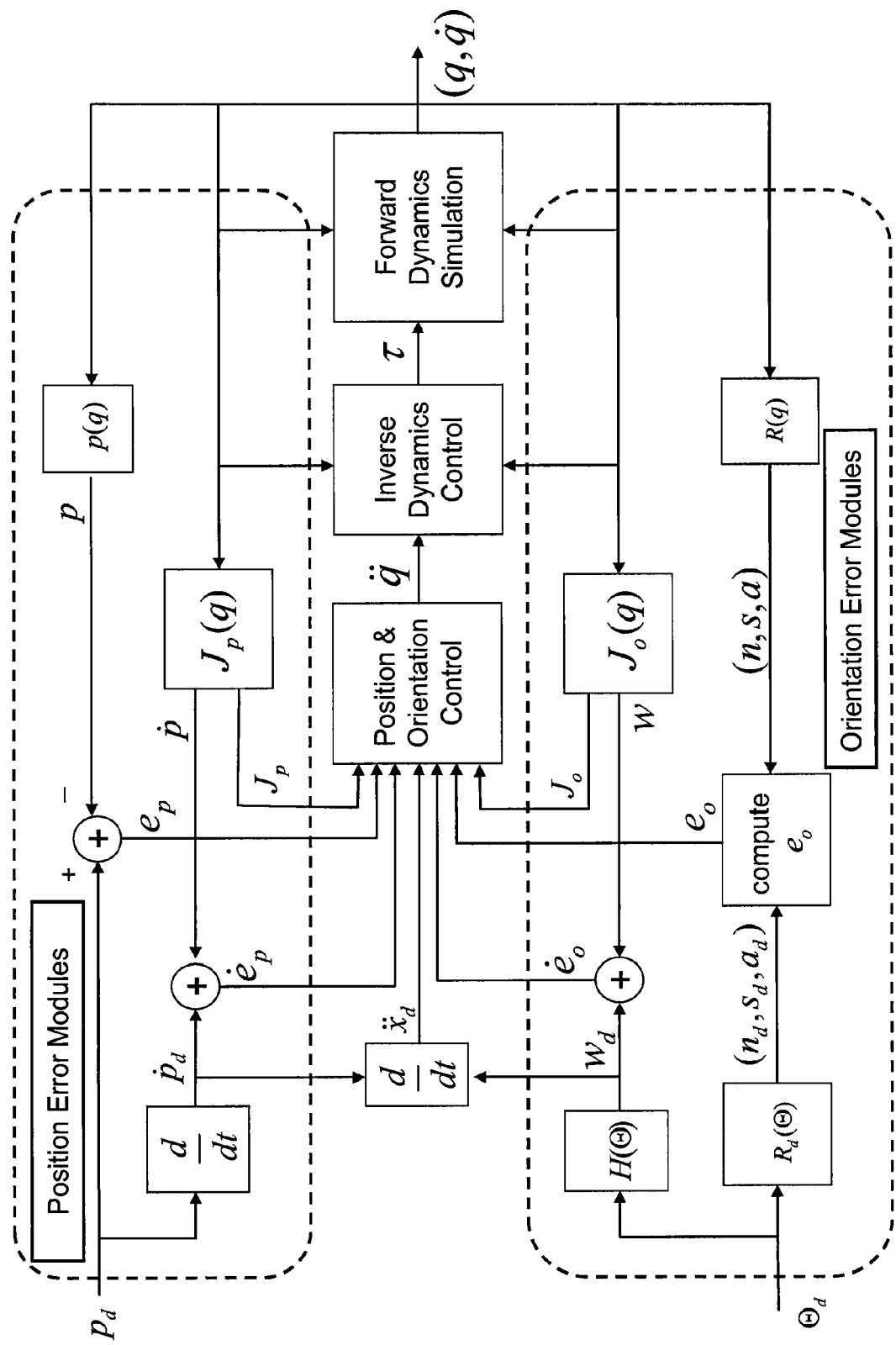
FIG. 8 is a block diagram illustrating a second order closed loop inverse kinematics tracking control system including position and orientation control systems.

FIG. 8 is a block diagram illustrating a second order closed loop inverse kinematics tracking control system including partitioned position and orientation control systems.

The second order closed loop inverse kinematics control in Equation 33 may be used to construct an inverse dynamics control algorithm. By incorporating the dynamics directly into the control law as well as using a dynamic model for prediction can potentially produce more realistic and natural looking motions which not only satisfy the kinematic constraints, but also dynamic constraints.

The dynamic equations of motion for a typical articulated body system has the general form, $$M(q)\ddot{q}+C(q,\dot{q})+G(q)=\tau \quad (37)$$

where M is the n×n joint space inertia matrix, C is the n×1 vector of Coriolis and Centripetal torques, G is the n×1 vector of gravitation torques, and τ is the n×1 vector of joint torques.

Equation 37 represents the joint space dynamics. In one embodiment, the motion controller system 300 may use a nonlinear model based compensation to dynamically decouple and linearize the closed loop system. One such compensation strategy is to use the following inverse dynamics control law:

$$\tau=\hat{M}(q)\alpha+\hat{C}(q,\dot{q})+\hat{G}(q) \quad (38)$$

where the caret notation ^ denotes estimates of the components of the dynamic model. The vector α represents a resolved acceleration control input which decouples and linearizes the closed loop system provided the model parameters in Equation 38 match those of Equation 37, and $$\alpha=\ddot{q} \quad (39)$$

The resolved acceleration in terms of the joint variables can be obtained as before, using the position and orientation feedback control law of Equation 33

$$\alpha=\ddot{q}=J^*(\ddot{x}_d-\dot{J}\dot{q}+K_p e+K_v \dot{e}) \quad (40)$$

The inverse dynamics control law given by Equation 38 utilizes joint space dynamic equations and task space accelerations. This type of control is typically called resolved acceleration control (RAC). Alternatively, it is possible to express both the dynamics equations as well as the control in terms task space, or "operational space". The task space (or operational space) dynamics that describe the motion of a robot with respect to task variables may be derived from Equation 20 and Equation 37. (See O. Khatib, "A unified approach for motion and force control of robot manipulators: The operational space formulation", *IEEE Journal of Robotics and Automation*, RA-3(1):43-53, 1987, the subject matter of which is incorporated herein by reference in its entirety.) The operational space dynamic equations have the structure:

$$M(x)\ddot{x}+C(x,\dot{x})+G(x)=T \quad (41)$$

where M is the n×n operational space inertia matrix, and C G, T are respectively the Centrifugal and Coriolis force vector, the gravity vector, and the force-torque vector acting in operational space.

Analogous to the developments for resolved acceleration control, the motion controller system 100 may formulate dynamically decoupled control to perform tasks and subtasks in operational space. A model based compensation in this space is given by:

$$T=\hat{M}(x)F^*+\hat{C}(x,\dot{x})+\hat{G}(x) \quad (42)$$

Decoupling and control of the task can therefore be achieved using the equation:

$$F^*=\ddot{x}.$$

Managing Multiple Tasks

Figure 9:
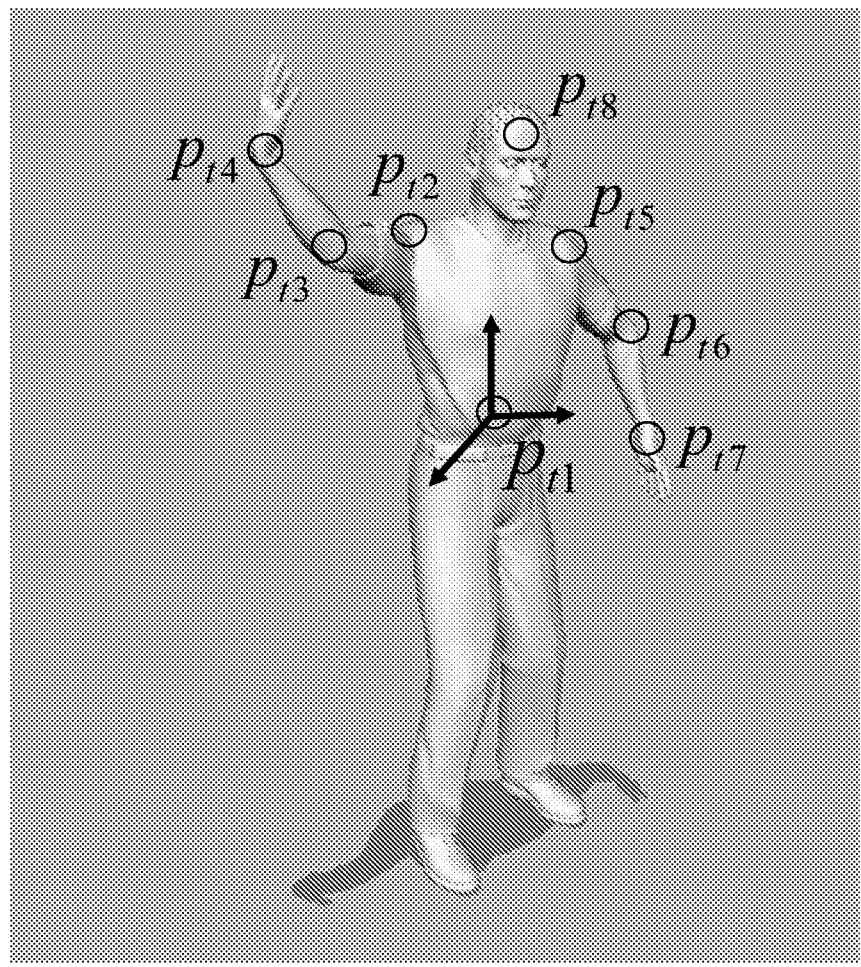
FIG. 9 is a diagram illustrating task descriptors on a source model and a generalized coordinate system.

FIG. 9 is a diagram illustrating task descriptors on a source model and a generalized coordinate system. A task descriptor may be any quantity that can be expressed as a function of the generalized coordinates. Examples of task descriptors may include positions of landmarks on body segments, orientations of body segments, or positions of whole body center of mass. Desired task descriptors may be obtained or inferred from measurements. FIG. 9 illustrates desired landmarks that can be conveniently measured or inferred and incorporated in the description of the task.

In one embodiment, the motion controller system 100 may perform multiple tasks simultaneously. For example, task descriptors may represent multiple landmark locations on the human structure. Execution of one task descriptor may have a higher importance or higher priority than other task descriptors. For example, suppose the target system 104 is to perform a grasping task. The source system 102 may provide multiple task descriptors, such as the desired hand position, and desired shoulder position. In instances in which the target system cannot satisfy multiple tasks, the motion controller system 100 may assign a higher weight or a higher priority to achieving the desired motion, such as hand position over achieving the desired shoulder position. Two embodiments of the motion controller system 100 for managing multiple tasks are described, namely, 1) weighting strategy and 2) prioritized strategy.

Task Augmentation: Weighting Strategy

Suppose there are p number of tasks that are to be executed. Let $\dot{x}_i$ represent the spatial velocity of the $i_{th}$ task descriptor and $J_i$ the associated Jacobian. Task augmentation refers to the concatenation of the individual spatial velocities $\dot{x}_i$ into a 6r×1 vector $\dot{x}$, and the concatenation of the associated task Jacobian matrix $J_i$ to form the 6r×n matrix J, such that, $$\dot{x}=[\dot{x}_1 \ldots \dot{x}_p]^T \quad (43)$$

$$J=[J_1 \ldots J_p]^T \quad (44)$$

Likewise, $\dot{x}_d$ in the augmented space is the concatenation of the each desired task descriptor spatial velocity. The solution of tracking control algorithm in the augmented system follows exactly the same as that previously described by Equations 26, 33, and 40.

The tracking error rate for each element of a task descriptor can be controlled by the feedback gain matrices. For a first order system in Equation 26, the trajectory tracking error convergence rate depends on the eignevalues of the feedback gain matrix K; the larger the eignevalues, the faster the convergence. In one embodiment, such systems may use a discrete time approximation of the continuous time system; therefore, it is reasonable to predict that an upper bound exists on the eigenvalues; depending on the sampling time. A particular task (or specific directions of particular task) can be more tightly controlled by increasing the eigenvalue of K associated with direction of the particular task.

Prioritizing Tasks

Assume that a task comprises two subtasks with the order of priority. The first priority subtask is specified using the first task variable, $x_1 \in \Re^{m_1}$, and the second subtask by the second task variable, $x_2 \in \Re^{m_2}$. The two task variables may represent the position of a task descriptor and the orientation of its frame, respectively.

The differential kinematic relationship between the joint velocity $\dot{q} \in \Re^n$ and the Cartesian variable is expressed by:

$$\dot{q} = J_i^+(q)\dot{x}_i \quad (45)$$

where $J_i$ is the Jacobian matrix of the $i_{th}$ task descriptor and $J^+$ is typically defined as right pseudo-inverse if J, given by $J^+ = J^T (JJ^T)^{-1}$. An inverse kinematics solution with movement prioritization with the two desired movements is described by:

$$\dot{q} = J_1^+ \dot{x}_1 + N_1 v_n \quad (46)$$

where $v_n$ is an arbitrary vector and $N_1 = (I - J_1^+ J_1)$ projects $v_n$ onto the null space of $J_1$. If an exact solution does not exist, Equation 46 represents a least squares solution that minimizes $\|\dot{x}_1 - J_1(q)\dot{q}\|$. By substituting Equation 46 into Equation 45 for i=2, an exact solution for $v_n$ may be found if it exists. If an exact solution does not exist, a solution for $v_n$ may be found that minimizes, $\|\dot{x}_2 - J_2(q)\dot{q}\|$, given by:

$$v_n = (J_2 N_1)^+ (\dot{x}_2 - J_2 J_1^+ \dot{x}_1) \quad (47)$$

The above procedure for a prioritized two task problem has been outlined in Y. Nakamura, *Advanced Robotics, Redundancy and Optimization.* Adisson-Wesley, 1991, the subject matter of which is incorporated herein by reference in its entirety. A prioritized solution can be extended to more than two tasks following the same procedure.

5.3 Balance Control

Figure 10:
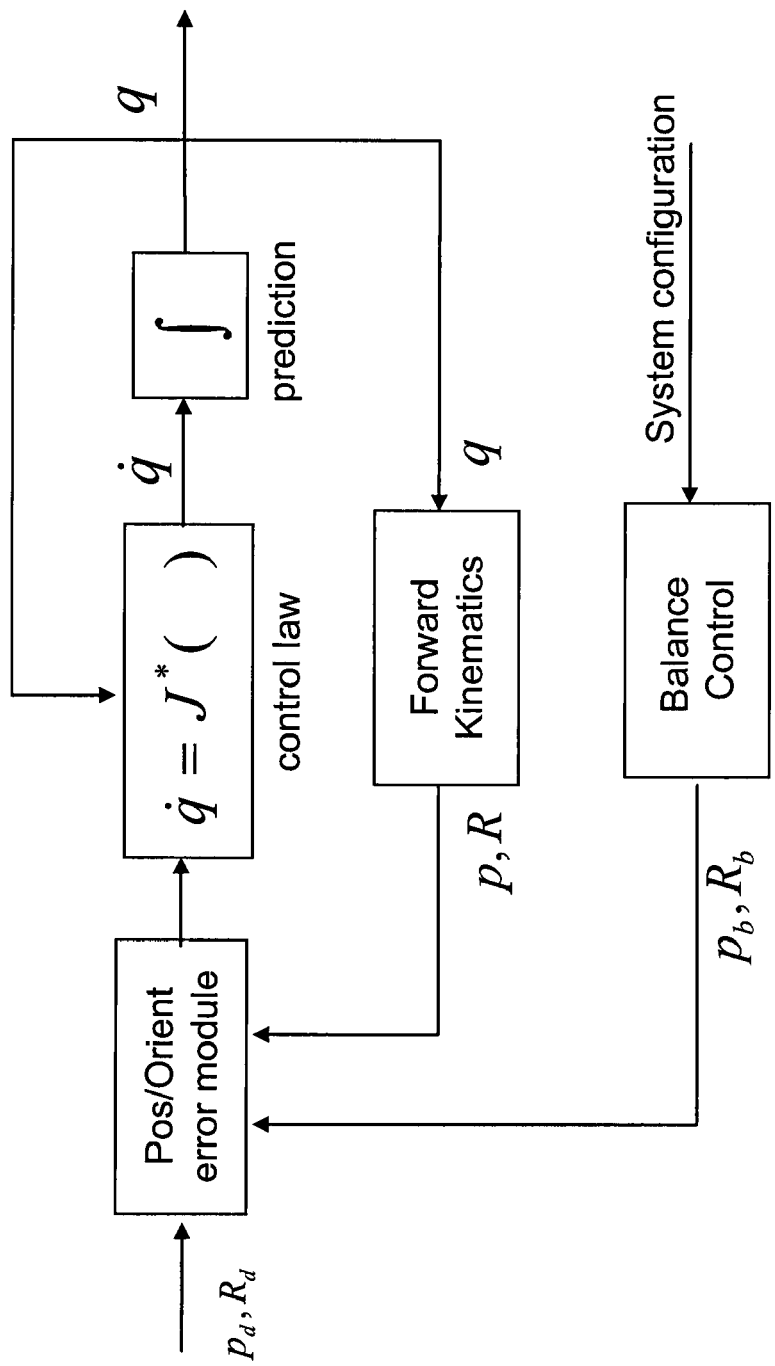
FIG. 10 is a block diagram illustrating a first order closed loop inverse kinematics system including a balance descriptor as an inferred task variable.

FIG. 10 is a block diagram illustrating a first order closed loop inverse kinematics system including a balance descriptor as an inferred task variable.

The motion controller system 300 may directly observe or synthesize desired task variables, or may "infer" from a control policy that creates the desired task descriptors to produce a certain behavior. Such desired task descriptors are referred to here as "inferred" task descriptors, because they are typically inferred from a system that monitors the current state of the target system 104 and produces a desired task descriptor. Balance maintenance is an example of a behavior that may be controlled by an inferred balance descriptor.

In one embodiment, the target system 104 represents a human or a humanoid robot. Balance criteria such as the Zero Moment Point (ZMP), or whole body center of mass are used in order to produce a desired balancing descriptor that is a function of q. Commanding the position of the whole body center is one effective task descriptor to partially control balance.

Let $p_{cm}$ represent the position of the whole body center of mass, computed as $$p_{cm} = \sum_{i=1}^{N} \frac{m_i}{M} p_{cm_i} \quad (48)$$

where M is the total body mass, and $m_i$ and $p_{cm_i}$ correspond to the mass and the position of the center of mass of segment i, respectively. As before, the relationship between the center of mass velocity and the joint velocity is established through the Jacobian of the center of mass $J_{CM}$.

$$\dot{p}_{CM} = J_{CM} \dot{q} \quad (49)$$

Unlike the observed task descriptors which represent the desired motion obtained from measurements, the system 300 may include a separate control system to determine the desired position of the center of mass $p_{d_{cm}}$ that will produce a balanced motion.

In addition to the desired center of mass position, other descriptors can be used to control balance. For example, body inclination and feet positions are some examples. If task augmentation is used to manage all task descriptors, the relevant balance descriptor velocities can be concatenated together and incorporated into a single balancing descriptor vector velocity, denoted by $\dot{x}_b$. The 1 . . . p observed tasks may be augmented with the balancing tasks in a similar manner as was done in Equations 43 and 44. The new augmented system may be represented as:

$$\dot{x} = [\dot{x}_1 \ldots \dot{x}_p | \dot{x}_b]^T$$

$$J = [J_1 \ldots J_p | J_b]^T \quad (49)$$

where for purpose of illustration only, partitioned the observed descriptors and the balancing descriptors are partitioned by a vertical separating line. In one embodiment, the balance descriptor is among the highest priority or the most important task descriptor to satisfy in many applications.

Constraints

In one embodiment, the target system 104 has kinematic and dynamic constraints that are to be satisfied. Constraints to avoid joint limits, self collisions, and collisions with the environment are examples of kinematic constraints. Singular configurations also impose constraints on the allowable regions of the workspace that the target system 104 can pass through without regularization. Moreover, the target system 104 may also have limits on the allowable joint velocities and joint torques. This is especially true if the target system 104 is a robot whereby actuator velocity limits and torque limits are critical. These constraints are sometimes handled in the null-space by specifying the vector $v_n$ for a convenient utilization of redundant degrees of mobility. These constraints may also be considered at the highest priority level, in which case they are used as the first task.

If the constraints are handled in the null-space, the motion controller system 300 may specify the vector $v_n$ for a convenient utilization of redundant degrees of mobility by constructing an objection function w(q) whose gradient defines the vector $v_n$, as:

$$v_n = k_o \left( \frac{\partial w}{\partial q} \right)^T \quad (52)$$

where $k_o > 0$. Because the solution moves along the direction of the gradient of the objective function, it attempts to locally maximize it compatible to the primary objective (kinematic constraint). The motion controller system 300 may use an objective functions, e.g., for singularity avoidance, joint limit avoidance, and collision avoidance.

Handling Singularities

The motion controller system 100 may include processing for handling singularities, such as the singularity robustness system 324. The singularities may be task singularities due to physical limitations or algorithmic singularities due to mathematics of the motion. In configurations where the Jacobian matrix in Equation 7 is full rank, any velocity $\dot{x}$ can be attained. When J becomes rank deficient, the mechanism is said to be at a singular configuration. In the neighborhood of singular configurations, a small change in $\dot{x}$ may require a very large change in q. This causes a large error in the task motion, since the joint torques and velocities required to execute such a motion exceed the physical capabilities of the target system 104. The singularity problem becomes an inherent problem in controlling any target system 104 representing a physical model or system. Singularities impose constraints on the feasibility and accuracy of the solution and may be therefore characterized as constraints within control hierarchy of the motion controller system 100.

There are several embodiments for overcoming the inherent singularity problem. In one embodiment, the motion controller system 100 plans a trajectory that is away from singular points by using a potential function that is a measure of the manipulability of a task. In one embodiment, the mechanisms of the target system 104 may be allowed to pass through singular points and their neighborhood through the use of a singularity robust inverse of the Jacobian matrix (see Y. Nakamura and H. Hanafusa, "Inverse kinematic solution with singularity robustness for robot manipulator control", *ASME J. Dyn. Sys. Meas., Contr.*, 108(3):163-171, 1986, the subject matter of which is incorporated herein by reference in its entirety), also known as the damped least squares method (DLS) (see C. W. Wampler, "Manipulator inverse kinematic solutions based on vector formulations and damped least squares methods", *IEEE Trans. Sys., Man, Cyber.*, 16(1):93-101, 1986, the subject matter of which is incorporated herein by reference in its entirety.). The transpose of the Jacobian can be used in lieu of matrix inversion, which provides a noticeable computation savings as well as it represents an alternative to the use of a DLS inverse for handling singularities (See L. Sciavicco and B. Siciliano, "A solution algorithm to the inverse kinematic problem for redundant manipulators", *IEEE Journal of Robotics and Automation*, 4:403-410, 1988, the subject matter of which is incorporated herein by reference in its entirety). The DLS method is described next in more detail.

The most general form of the damped least squares inverse was defined in Equation 24 and repeated below, $$J^* = W_1^{-1} J^T (J W_1^{-1} J^T + W_2)^{-1} \quad (53)$$

where $W_2 = \lambda^2 I$ is the damping term, $\lambda > 0$ is the damping factor, and I is the identity matrix. If $W_1$ is the identity matrix, Equation 53 satisfies the optimization condition:

$$\min_{\dot{q}} (\|x - J(q)\dot{q}\|^2 + \lambda^2 \|\dot{q}\|^2) \quad (54)$$

Small values of $\lambda$ give accurate solutions but low robustness to the occurrence of singular and near-singular configurations. Large values of $\lambda$ result in low tracking accuracy even when a feasible and accurate solution would be possible. The damping factor establishes the relative weight between the two objectives. Choosing a constant value for $\lambda$ may turn out to be inadequate for obtaining good performance over the entire "Target" system workspace. There exists methods for adaptively selecting the damping factor based on some measure of closeness to the singularity at the current "Target" system configuration (See S. Buss and J. S. Kim, "Selectively damped least squares for inverse kinematics", *Journal of Graphics Tools* 10:3, 37-49, 2005, the subject matter of which is incorporated herein by reference in its entirety) (See A. A. Maciejewski and C. A. Klein. Obstacle avoidance for kinematically redundant manipulators in dynamically varying environments. *International Journal of Robotics Research*, 4:109-117, 1985, the subject matter of which is incorporated herein by reference in its entirety.)

Joint Limit Avoidance

The motion controller system 100 may use several methods to avoid joint limits. One is the Gradient projection method. A performance criterion is defined as a function of joint limits and its gradient is projected onto the null space projection matrix of the Jacobian to obtain the self-motion necessary to optimize the performance criterion. A second method is the Weighted Least-Norm (WLN) solution to avoiding joint limits. The WLN solution was originally proposed by T. F. Chan and R. V. Dubey, "A weighted least-norm solution based scheme for avoiding joint limits for redundant joint manipulators", *IEEE Transactions on Robotics and Automation*, 11(2), 1995, the subject matter of which is incorporated herein by reference in its entirety. A WLN solution is formulated in the context of the Damped Least Squares Jacobian inverse.

Consider once again the weighted damped least squares inverse of J from Equation 24. Suppose $W_1$ is a diagonal matrix used for joint limit avoidance, defined by:

$$W_1 = \begin{bmatrix} w_1 & 0 & 0 & 0 \\ 0 & w_2 & 0 & 0 \\ 0 & 0 & \ddots & 0 \\ 0 & 0 & 0 & w_n \end{bmatrix} \quad (55)$$

The scalers $w_i$ corresponding to the diagonal elements of $W_2$ are defined by, $$w_i = \begin{cases} 1 + \left|\frac{\partial H}{\partial q_i}\right| & \text{if } \Delta \left|\frac{\partial H}{\partial q_i}\right| \geq 0 \\ 1 & \text{if } \Delta \left|\frac{\partial H}{\partial q_i}\right| < 0 \end{cases} \quad (56)$$

where H(q) is the performance criterion to avoid joint limits and $$\frac{\partial H(q)}{\partial q_i}$$

is its gradient defined by:

$$H(q) = \frac{1}{4} \sum_{i=1}^{n} \frac{(q_{i,max} - q_{i,min})^2}{(q_{i,max} - q_i)(q_i - q_{i,min})} \quad (57)$$

$$\frac{\partial H(q)}{\partial q_i} = \frac{(q_{i,max} - q_{i,min})^2 (2q_i - q_{i,max} - q_{i,min})}{4(q_{i,max} - q_i)^2 (q_i - q_{i,min})^2} \quad (58)$$

where $q_i$ is $i_{th}$ degree of freedom, and $q_{i,min}$ and $q_{i,max}$ are the lower and upper joint limits, respectively. It should be noted that $$\frac{\partial H(q)}{\partial q_i}$$

is equal to zero if the joint is at the middle of its range and goes to infinity at either limit. The second condition in Equation 56 allows the joint to move freely if the joint is moving away from the limit because there is no need to restrict or penalize such motions.

Collision Avoidance

Collision avoidance of a target system 104 with itself or with other obstacles allows the system 104 to safely execute a motion. Collision avoidance may be handled by defining collision points which are identified at each instant when two point pairs are approaching collision. Each collision point in a point-pair is defined as either "re-active" or "passive". A re-active collision point may be regarded as a task descriptor for collision avoidance and controlled in the same way that other task descriptors are controlled. A re-active collision point, therefore, represents a collision task descriptor whose desired motion is determined based on a control policy which reacts to avoid collision. A passive collision point is one that is not explicitly controlled for collision avoidance. Passive collision points are either attached to an external system (such as the environment or obstacle), or attached to a different rigid body on the target system 104. In one embodiment, the motion controller system 100 processes a collision point that is attached to an external system as passive. This embodiment may be used, for example, if the collision point is not controllable by an internal control system of the target system 104.

If the collision points in a point-pair are both attached to the target system 104 (self collision), the designation of "re-active" and "passive" collision points is more complex. A practical resolution for the designation may be to consider metrics related to minimizing the energy required to move a collision point away from collision. One possible metric is to consider an inertia weighted Jacobian inverse for the inverse kinematics or inverse dynamics solution, by substituting $M=W_1$ in Equation 24, where M is the joint space inertia matrix. This solution minimizes the kinetic energy required to execute the task; however, the inertia weighted Jacobian inverse solution requires the calculation of the joint space inertia matrix which is computationally expensive and may not be practical for closed loop inverse kinematic solutions. A more computationally feasible and algorithmically simple alternative is to use the relative mass of the rigid body associated with collision point-pairs. The point-pair attached to the larger mass will be designated as the passive collision point while the point pair attached to the smaller mass will be designated as the re-active collision point. Consider, for example, the collisions between the hand and the torso. The torso collision point will be designated as a passive collision point while the hand collision point will be designated as a re-active collision point.

Once the designation of re-active and passive collision points have been established, the computed collision avoidance task descriptor velocity is defined by, $$\dot{x}_c = p_p(q) - p_r(q) \quad (59)$$

where $p_p(q)$, $p_r(q)$ are the passive and reactive collision points. The term computed, as before, implies the quantities are calculated by the forward kinematics system 312 and are a function of q. We can further augment the system in Equation (50) and (51) maybe be further augmented with the collision avoidance descriptor velocity and the associated Jacobian, denoted by $\dot{x}_c$ and $J_c$, respectively.

$$\dot{x} = [\dot{x}_1 \ldots \dot{x}_p | \dot{x}_b | \dot{x}_c]^T \quad (60)$$

$$J = [J_1 \ldots J_p | J_b | J_c]^T \quad (61)$$

The collision avoidance system may determine a control policy that produces a desired collision avoidance task descriptor to: a) monitor the distance d to collision, and b) stop the motion of the collision point in the direction of the collision if the collision distance is less than a threshold $d < d_{thresh}$. The collision avoidance system may command the desired velocity to be equal and opposite to the current direction of the collision point.

$$\dot{x}_{c_d} = \begin{cases} -\dot{x}_c & \text{if } d < d_{thresh} \\ 0 & \text{if } d \geq d_{thresh} \end{cases} \quad (62)$$

Joint Velocity Limits

There are typically limits on the allowable joint velocities of each degree of freedom in the target system 104, which may be determined by the physical limits of the actuators driving a joint. In robotics, joint velocity constraints may be handled by clamping the velocities when they reach their limit. Alternatively, velocities may be controlled by using a similar approach as the damped least squares Jacobian inverse described above by modulating the damping factor. While these approaches preserve the time to execute the entire motion, they do not preserve the original trajectory profile. The resulting motion trajectory may be significantly altered from the original motion. In this section, a method is described that limits joint velocities by adaptively modulating the time between two successive samples while keeping the original joint motion profile unaltered.

To simplify notation, the subscript i, previously referred to quantities associated with joint i (i.e. $q=q_i$ and $\dot{q}=\dot{q}_i$), is dropped. Let $\dot{q}_k (k=1 \ldots N)$ represent a length N sequence corresponding to a discrete time representation of $\dot{q}(t)$. In the discrete implementation of the algorithm, the discrete time sequence at sample k+1 is given by:

$$t_{k+1} = t_k + \Delta t_k \quad (63)$$

where $\Delta t_k$ is sample time. The time modulation scheme for joint limit avoidance replaces the time sequence in Equation (63) with the following:

$$t'_{k+1} = t'_k + \Delta t_k \epsilon_k \quad (64)$$

where $\epsilon_k$ is a time-modulation factor which can be designed to ensure that the joint velocities remain below their limits. In one embodiment, the factor $\epsilon_k$ meets the following conditions:
1. Preserve the profile of the original joint trajectory.
2. Preserve the sample time if joint velocity is below its limit, e.g., $\Delta_k = \Delta'_k$.
3. Modulate the sample time if the joint velocity is at, or beyond its limit such that modified velocity remains at its limit, i.e. $|\dot{q}'_k| = \dot{q}_{lim}$ where $\dot{q}_{lim}$ is the joint velocity limit associated with a particular degree of freedom.

The first condition provides that:

$$\Delta q'_k = \Delta q_k \quad (65)$$

where, $$\Delta q_k = q_{k+1} - q_k$$

$$\Delta q'_k = q'_{k+1} - q'_k \quad (66)$$

A first order finite difference approximation of the time derivative provides:

$$\Delta q_k = \dot{q}_k \Delta t_k$$

$$\Delta q'_k = \dot{q}'_k \Delta t_k \quad (67)$$

where $\Delta t'_k = \Delta t_k \epsilon_k$. It follows from Equation (65) and (67), and the third condition that:

$$|\dot{q}_k| \Delta t_k = \dot{q}_{lim} \Delta t_k \epsilon_k \quad (68)$$

where $|\dot{q}'_k|=\dot{q}_{lim}$ is forced. From Equation (68), $\epsilon_k$ is solved:

$$\epsilon_k = \frac{|\dot{q}_k|}{\dot{q}_{lim}} \quad (69)$$

The time modulation scheme to ensure the three conditions listed above can be summarized as follows:

$$t'_{k+1} = \begin{cases} t'_k + \Delta t_k \, \epsilon_k & \text{if } \epsilon_k \geq 1 \\ t'_k + \Delta t_k & \text{if } \epsilon_k < 1 \end{cases} \quad (70)$$

where $\epsilon_k$ is defined by Equation (69). Note that by definition, $\epsilon_k > 1$ implies that the joint velocities are equal or above their limits and corrective action is required by modulating (expanding) time. Furthermore, $\epsilon_k < 1$ implies the joint velocities are below their limits and time modulation is unnecessary.

Note that the example above preserves the original motion profile, but may indeed expand the total time to execute the motion. In order to preserve the motion profile as well as the total execution time, other time modulation embodiments may use a $\Delta t_k$ that is expanded if joint velocities exceed their limits and $\Delta t_k$ is shortened if the joint velocities are below their limits. This may be performed in such a way that the overall execution time remains unchanged.

In another embodiment, time modulations may use the first and second order time derivatives of q that have certain smoothness and continuity characteristics. In this embodiment, the factor $\epsilon_k$ may be determined accordingly. The concept of time modulation may be applied to limit joint accelerations by considering the second order time derivative of q. In fact, the concept of time modulation may used to limit any physical quantity that can be expressed as a function of time.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for controlling the pose of a physical articulated system, the method comprising:
    observing a plurality of task descriptors for a position and an orientation of members of a source system comprising human features observed from images of human motion;
    generating a position error between a computed position and the position of the members of the source system;
    generating an orientation error between a computed orientation and the orientation of the members of the source system;
    generating, using a non-transitory computer readable storage medium, a control command according to a control law based on the position error, orientation error, and kinematic constraints;
    constructing, using the non-transitory computer readable storage medium, a weighted matrix based on the generated control command and the kinematic constraints of members of the physical articulated system;
    generating, using the non-transitory computer readable storage medium, joint variables for positioning and orienting the members of the physical articulated system while enforcing the kinematic constraints of the members by applying the weighted matrix to the observed task descriptors, the number of task descriptors being less than a degrees of freedom of movement of the source system; and
    storing the generated joint variables in the non-transitory computer readable storage medium.

2. The method of claim 1, further comprising:
    generating constraints on positions of the members of the physical articulated system, wherein the weighted matrix is constructed based at least in part on the constraints.

3. The method of claim 2 wherein the observing comprises second order closed loop inverse kinematics.

4. The method of claim 3 wherein the observing further comprises regularizing an inverse Jacobian matrix of a motion of the source system.

5. The method of claim 1 further comprising:
    generating a balance control command in response to the generated joint variables.

6. The method of claim 1 wherein the observing comprises first order closed loop inverse kinematics.

7. The method of claim 6 wherein the observing further comprises regularizing an inverse Jacobian matrix of the position of the members of the source system.

8. The method of claim 1 further comprising:
    calculating forward kinematics of the joint variables to generate said computed position and computed orientation.

9. The method of claim 1 wherein the kinematic constraints comprise singularities arising from limitations of performing tasks due to insufficient degrees of freedom for executing the tasks.

10. The method of claim 1 wherein the kinematic constraints comprise singularities arising from mathematics of the generating.

11. The method of claim 1 wherein the physical articulated system is a human model.

12. The method of claim 1 wherein the physical articulated system is a robot.

13. A system for positioning a physical articulated system, the system comprising:
    a first control system for observing a plurality of task descriptors for a position and an orientation of members of a source system, comprising human features observed from images of human motion;
    a second control system for
    generating a position error between a computed position and the position of the members of the source system;
    generating an orientation error between a computed orientation and the orientation of the members of the source system;
    generating a control command according to a control law based on the position error, orientation error, and kinematic constraints;
    constructing a weighted matrix based on the generated control command and the kinematic constraints of members of the physical articulated system, and
    generating joint variables for positioning and orienting the members of the physical articulated system while enforcing the kinematic constraints of the members by applying the weighted matrix to the observed task descriptors, the number of task descriptors being less than a degrees of freedom of movement of the source system; and a non-transitory computer readable storage medium for storing the generated joint variables.

14. The system of claim 13 wherein the second control system is further configured for generating constraints on positions of the members of the physical articulated system, wherein the weighted matrix is constructed based at least in part on the constraints.

15. The system of claim 13 wherein the second control system is further configured for generating a balance control command in response to the generated joint variables.

16. The system of claim 13 wherein the observing comprises first order closed loop inverse kinematics.

* * * * *